(12) United States Patent
Schwantes et al.

(10) Patent No.: US 8,796,381 B2
(45) Date of Patent: Aug. 5, 2014

(54) ENCAPSULATED CURE SYSTEMS

(75) Inventors: Todd Arlin Schwantes, Lena, WI (US);
Michael Curley Krzoska, Little Chute, WI (US); Gregory Stephen Kulibert, Oshkosh, WI (US); Adam Gregg Malofsky, Loveland, OH (US); Bernard Miles Malofsky, Bloomfield, CT (US); Nagib Maurice Ward, Raleigh, NC (US)

(73) Assignee: Appvion, Inc., Appleton, WI (US)

( * ) Notice: Subject to any disclaimer, the term of this patent is extended or adjusted under 35 U.S.C. 154(b) by 0 days.

(21) Appl. No.: 13/235,357

(22) Filed: Sep. 17, 2011

(65) Prior Publication Data

US 2012/0010364 A1 Jan. 12, 2012

Related U.S. Application Data

(63) Continuation of application No. 11/216,516, filed on Aug. 31, 2005, now Pat. No. 8,119,214.

(60) Provisional application No. 60/606,720, filed on Sep. 1, 2004, provisional application No. 60/665,134, filed on Mar. 25, 2005, provisional application No. 60/692,008, filed on Jun. 17, 2005.

(51) Int. Cl.
*C09J 129/04* (2006.01)
*C08L 79/04* (2006.01)
*B32B 15/02* (2006.01)
*C08J 3/24* (2006.01)
*B01J 13/02* (2006.01)

(52) U.S. Cl.
CPC .. *C08J 3/241* (2013.01); *C08J 3/24* (2013.01); *B01J 13/02* (2013.01)
USPC .............. 525/57; 525/27; 525/55; 525/56; 525/540; 525/330.9; 428/327; 428/458; 428/402.21; 428/402.22

(58) Field of Classification Search
USPC ........... 523/111, 211, 440, 447, 160; 522/13, 522/75, 81, 83; 428/402–402.22, 407, 500; 525/57, 55, 540, 56, 241
See application file for complete search history.

(56) References Cited

U.S. PATENT DOCUMENTS 3,725,501 A * 4/1973 Hilbelink et al. ................ 525/28
6,592,990 B2 * 7/2003 Schwantes ............... 428/402.21

* cited by examiner

*Primary Examiner* — James J Seidleck
*Assistant Examiner* — S. Camilla Pourbohloul
(74) *Attorney, Agent, or Firm* — Edward K. Welch, II; IP&L Solutions

(57) ABSTRACT

Encapsulated cure systems are provided wherein a curative is incorporated into a solid or semi-solid carrier material whereby mere fracturing or failure of the capsule wall encapsulating such cure systems will not provide for or allow sufficient release of the curative. Also provided are adhesive systems incorporating said encapsulated cure systems.

21 Claims, No Drawings

ENCAPSULATED CURE SYSTEMS

This application is a Continuation of co-pending U.S. patent application Ser. No. 11/216,516 filed on Aug. 31, 2005 which is based upon and claims priority from U.S. Provisional Patent Application No. 60/606,720, filed Sep. 1, 2004; 60/665,134, filed Mar. 25, 2005, and 60/692,008, filed Jun. 17, 2005, the contents of which are incorporated herein by reference.

BACKGROUND OF THE INVENTION

1. Field of the Invention

This invention relates to adhesive and sealant compositions wherein one or more of the reactive and/or curable or polymerizable constituents of said compositions are encapsulated. It more particularly relates to encapsulated cure systems for, directly or indirectly, initiating and/or effectuating the cure or polymerization of adhesive and sealant compositions, as well as methods of making the same.

2. Description of Related Art

The use of microencapsulated ingredients in the manufacture of pharmaceuticals, pesticides, paints, adhesives, sealants and printing inks is well known. Perhaps the most widely known use of microcapsules has been in the product generally referred to as carbonless paper which incorporate or have applied thereto coatings comprising microencapsulated inks and/or other color forming agents that are released upon the application of pressure to the paper surface. In the manufacturing and service sectors one of the most widely known use of microcapsules has been in the manufacture of adhesives and sealants. Here the use of microencapsulation allows one to form a one-part adhesive or sealant from a typical two- or more-part adhesive and sealant system. Microencapsulation also allows one to pre-apply such adhesives and sealants to substrates at the site of manufacture or conversion rather than at the site of use or installation. The use of microencapsulation in adhesive and sealants is well known and takes many different paths.

Encapsulated solvent-based adhesive systems are of several different constructs. Roesch et al. (U.S. Pat. No. 5,922,798) teach solvent based adhesive compositions wherein a solvent, alone or together with a therein dissolved resin, is encapsulated and used to bond two substrates, each of which is dissolved or softened by the solvent. Eichel (U.S. Pat. No. 2,907,682) discloses adhesive tapes wherein the adhesive portion comprises a combination of encapsulated solvent and encapsulated solid adhesives, which are soluble in the solvent. Upon application of the tape to a substrate and the further application of pressure, the capsules rupture allowing the solvent to dissolve or at least tackify the adhesive whereby, upon evaporation or absorption of the solvent, an adhesive bond is formed. Where the solvent is non-evaporating, e.g., a plasticizer, and neither the substrate carrying the adhesive nor the substrate to which it is to be bonded absorb the non-volatile solvent, the result of the combination of the solvent and adhesive material is a pressure sensitive adhesive. Adhesives based on polyvinyl acetate, rubber, nitrile rubber, ethyl cellulose, or other cellulose derivatives such as cellulose acetate are especially suited for the solvent activation/reactivation type application.

Hot melt adhesive systems employing encapsulated solvents are also known. Baetzold et. al. (U.S. Pat. No. 6,084,010) teaches solid, tacky or non-tacky hot melt glue compositions having incorporated therein microcapsules of a solvent capable of softening or further tackifying the hot melt. Rubbing the hot melt composition, typically in the form of a stick, on the substrate to which it is to be applied fractures the capsules, releasing the solvent which, in turn, softens the hot melt and allows it to be deposited on the surface of the substrate.

Another type of encapsulated adhesive and sealant is that where the adhesive or sealant material or, in the case of a curable adhesive or sealant material, the components thereof are encapsulated in a single capsule. These capsules are typically applied to a substrate in a binder system that is non-tacky and dry to the touch. In this way, otherwise tacky or liquid flowable adhesives can be pre-applied, but not activated or bond forming until the capsule walls themselves are fractured releasing or exposing the adhesive materials. For example, Eichel (U.S. Pat. No. 2,986,477) teaches the encapsulation of tacky adhesive materials. Wallace (U.S. Pat. No. 4,428,982) teaches the encapsulation of curable anaerobic adhesives wherein the encapsulating material is air permeable so that the curable adhesive remains in a liquid or uncured state in the capsule until use. Schwantes (U.S. Pat. No. 6,592,990) teaches encapsulated adhesives, particularly pressure sensitive adhesives, wherein the adhesive is formed in-situ, after encapsulation of the ingredients therefore.

A third, and perhaps the most common use of encapsulation in adhesives and sealants, involves curable or reactive adhesive and sealant compositions which rely upon the presence of curatives or curing and/or cross-linking agents and/or other reactants such as activators, catalysts, initiators, accelerators, and the like for effecting polymerization or curing of the composition so as to form the desired adhesive or sealant, wherein one or more of the reactive constituents is encapsulated so as to isolate it from the other constituents. These adhesive and sealant compositions may be of a number of different types: some of the more typical being those based on epoxies, urethanes, unsaturated polyesters, alkyds, and (meth)acrylates, as monomers, pre-polymers, and low molecular weight polymers or combinations thereof. Such adhesive and sealant compositions are more typically found in the form of and characterized as two or more part systems wherein the parts are combined by the applicator at the time of use. However, with the advent of encapsulation technology, it is possible to encapsulate one or more of the reactive constituents, isolating it from the other constituents, so as to produce storage stable, one-part adhesive and sealant compositions. For example, the curatives or curing and/or cross-linking agents and/or other reactants may be encapsulated and said capsules dispersed in the liquid polymerizable monomer which forms the matrix of the adhesive or sealant. Alternatively, the liquid polymerizable component may be encapsulated and the curative or curing agent adhered to the outer wall of the capsule or the liquid polymerizable component may itself be encapsulated as well.

Oftentimes these one-part adhesive and sealant compositions encompass several different microcapsules, each containing one of the curatives or curing and/or cross-linking agents and/or other co-reactive constituents alone or together with other constituents of the adhesive or sealant composition. For example, with a free-radical polymerizable adhesive or sealant composition, so long as the oxidizing agent (typically the peroxide) and the reducing agent (typically an amine and/or metallocene) are in separate capsules, the system is stable. Here two different microcapsules may be employed wherein each contains a portion of the polymerizable component and one or more of the aforementioned curing agents and/or co-reactants. Similarly, for co-reactive polymerizable systems, each of the co-reactive species is encapsulated in separate microcapsules.

In the case of pre-applied adhesive and sealant compositions, typically a liquid adhesive or sealant composition containing the encapsulated component(s) dispersed therein is applied to the substrate and a polymer film formed over and encasing the liquid adhesive or sealant on the substrate to which it is applied. The polymer film holds the liquid adhesive or sealant composition in place and forms a protective barrier as well as a dry to the touch surface for the adhesive or sealant composition. Here, however, the curable or polymerizable component of the adhesive or sealant is not present in an encapsulated form, i.e., is not in the form of discrete microcapsules.

A second embodiment for the pre-applied adhesive and sealants is that where one or more of the components of the adhesive or sealant, including, in particular, the liquid polymerizable components, is encapsulated in a plurality of microcapsules which are dispersed in a liquid curable, polymerizable, or hardenable binder system. In this embodiment, one or more solid curative or curing agents or one or more solid activators, catalysts, initiators, accelerators, and the like for effecting curing or polymerization of the encapsulated liquid polymerizable component may be dispersed in the binder, without encapsulation. Alternatively, all of the components of the adhesive or sealant composition may be encapsulated in a plurality of different microcapsules which are dispersed in the liquid binder. In use, each of these modified binder systems is then applied to the intended substrate and allowed to cure, polymerize or harden; thereby binding the microcapsules to the substrate surface. Suitable binder systems may or may not co-react with the adhesive or sealant composition during cure or polymerization of the same. Most often the binders do not co-react, but instead act as a filler of the polymerizable or curable compositions.

Activation of these encapsulated adhesive and sealant compositions is effectuated by crushing the microcapsules so that the liquid polymerizable component comes into contact with the curative, curing agent, activator, catalyst, initiator, accelerator or the like. Mixing of the ingredients is reliant upon flow caused by the application of pressure and/or relative movement of the substrates to be bonded. Thus, because of the limited mixing, it is important that such systems be as fluid as possible to maximize the opportunity for mixing. Higher viscosity materials will result in less mixing and, thus, only partial curing of the curable materials. More importantly, higher viscosity materials are more difficult, if not impossible, to encapsulate. Where encapsulation is possible, particle size becomes an issue. Typically, in encapsulating high viscosity liquids, one tends to get a large number of large and small particles or microcapsules rather than a parabolic distribution where large and small particles are few.

While the advent of such encapsulated adhesive and sealant compositions has greatly broadened and/or simplified the end-use applications to which such adhesive and sealant systems are employed, they are not without remaining shortfalls. Premature fracturing of the capsules is perhaps the most prevalent of issues, especially in situations where the adhesive or sealant is used in rapid industrial manufacturing processes requiring quick delivery and application of the adhesive or sealant and, further, especially in the case of pre-applied adhesives or sealants, where the substrates to which the adhesives or sealants are pre-applied are likewise subject to such manufacturing processes, repeated handling or movement, etc. Concern for premature fracturing is not, however, limited to the application and use of the encapsulated adhesive. Such is also a great concern in the storage and handling of the microcapsules as well as the manufacture and processing of the adhesive or sealant itself, especially during incorporation of the encapsulated component into the matrix of the adhesive or sealant, or, in the case of pre-applied adhesive, incorporation of the encapsulated adhesive systems into the binder materials. Concerns with premature fracturing are heightened with systems that are thixotropic, have a high viscosity and/or incorporate fillers, especially granular fillers and fillers having sharp edges, or are subject to high shear mixing and dispensing processes.

Oftentimes to overcome concerns with premature fracturing, the thickness of the microcapsule walls is increased. This is especially found with pre-applied adhesives and sealants, particularly thread-locking or thread-sealing pre-applied adhesives and sealants, respectively. Consequently, cell walls comprising as much as 30 weight percent or more, more typically from 10% to 20% by weight, of the encapsulated component are not unusual in those one-part liquid systems to be applied at the time of use or from 15% to 25%, by weight in the case of pre-applied adhesives. However, as thicker and thicker walls are employed, less and less curable material is available with the same weight or volume of adhesive or sealant. Consequently, there is less curable material at the bond-line for forming the adhesive bond or seal. Because of the limited amount of curable material, there is poor flow and wetting of the substrate surfaces. Additionally, the large amount of shell wall fragments creates a gap between two substrates to be mated, much like grains of sand between plates of glass, which gap may be difficult to fill with the liquid curable material: again due to its limited quantity and low viscosity.

Furthermore, as the wall thickness increases, it becomes more and more difficult to break the cell walls when fracturing is desired. Thus, greater forces are needed to ensure the release of a comparable amount of the liquid curable or polymerizable component. Because rupture of the capsules in these instances is typically as a result of finger or hand pressure, pinch rollers and/or threading of threaded elements, the degree of rupture of the microcapsules lessens as the thickness of the capsule walls increases, especially if there is not a concurrent increase in the amount of pressure applied. This is particularly so for applications other than threading applications where multiple rotations are employed. Consequently, depending upon the specific end-use application, there may be poor or low sealant or bond strength due to the release of insufficient liquid curable or polymerizable components; thus, limiting performance or even the suitability of such materials for a given application. Similarly, as oftentimes found with the bonding and/or sealing of threaded elements, a larger volume of the pre-applied adhesive or sealant is necessary in order to attain the same bond or seal volume of cured material arising from the use of liquid, as opposed to pre-applied, adhesive and sealant compositions.

In order to moderate the need for thicker and thicker capsule walls, it is also known to incorporate hollow microspheres as "spacer" particles in the adhesive or sealant composition. For example, Hinterwaldner (U.S. Pat. No. 4,362,566) employs hollow microspheres to enhance storage stability of the adhesive formula as well as enhance fracturing of the microcapsules during activation and application of the adhesive material. However, the addition of such microspheres adds yet another additive to the system and, because the volume of the microspheres must be accommodated, requires the use of larger volumes of the adhesive and sealant to achieve the same bond or seal volume.

Consequently, it would be desirable to achieve encapsulated adhesive and sealant compositions in which the cell wall of the capsules is minimized and the quantity of liquid curable component is increased.

It would also be desirable to achieve encapsulated adhesive and sealant compositions having controlled flow characteristics, especially high or higher viscosities than are traditionally found with encapsulated adhesive and sealant compositions, and, in particular, having a fairly constant rheology over a larger temperature range, so as to enable their use in gap situations and other situations where squeeze-out or flow-out of the liquid curable material is undesirable.

It would also be desirable to achieve encapsulated adhesive and sealant compositions wherein, even if premature rupturing or fracturing of the capsules occurred, the composition was such that minimal, if any, reaction or polymerization of the curable or polymerizable components was able to occur.

It would also be desirable, especially for certain applications, to achieve the foregoing without the use of constituents or materials that are not relevant to the bonding and/or sealing of the substrates and surfaces to which they are to be applied.

It would also be desirable to achieve one-part storage stable adhesive and sealant compositions which are especially suited for use in high speed, industrial manufacturing processes.

It would also be desirable to achieve pre-applied adhesives which are able to withstand large pressures and forces without activation, especially in a pre-applied state on a given substrate.

SUMMARY OF THE INVENTION

According to the present invention there are provided microencapsulated cure systems for initiating and/or effectuating, directly or indirectly, the cure or polymerization of adhesive and sealant compositions. These microencapsulated cure systems comprise at least one curing agent, a carrier in which the curing agent is dispersed as a discrete phase or where the curing agent is wholly or partly solubilized in or miscible with the carrier, and a polymer shell encapsulating the carrier wherein the carrier is, in the absence of external forces, a substantially non-flowing material. Preferably, the carrier is a material that is a solid or semi-solid at ambient temperature but softens or flows at elevated temperatures, a solid or semi-solid that softens or flows upon exposure to the liquid curable or polymerizable component of the adhesive or sealant, a putty-like or gel-like material, or a combination of the latter that flows upon the application of modest force. A preferred aspect of the encapsulated cure system is that the curing agent is substantially or totally prevented from allowing a substantial or total cure of the curable composition to which it is to be added until an intimate mixing event occurs.

More specifically, the present invention is directed towards an encapsulated cure system for curable compositions comprising (a) a carrier material, (b) a curative contained in said carrier material, and (c) a polymer capsule encasing said carrier material wherein the carrier is a natural or synthetic material or composition that is substantially non-flowing in the absence of external forces or elevated temperatures. Preferably, the carrier material is (a) soft, putty-like or gel-like in character, (b) a solid or semi-solid that is (i) soluble in or is softened by a liquid curable matrix component of the curable composition with which they are to be used, (ii) softened by the reaction and/or environmental conditions under which the curable composition is cured or polymerized or (iii) is softened by the method or process by which the curative is to be made available to the curable, polymerizable or cross-linkable component of said adhesive or sealant. In one embodiment, it is contemplated that the carrier, which may be of a soft putty-like or gel-like character, comprises a thixotropic or thickened composition of monomers, oligomers or prepolymers, or a combination thereof, which composition is substantially non-reactive with the curative in the encapsulated state. It is also contemplated that the carrier includes or comprises one or more thixotropic agents or non-thixotropic gelling or thickening agents that are generated in-situ or act latently concurrent with or following encapsulation of the carrier material. Among the various materials that may be considered for carrier there are given hot melts, pressure sensitive adhesives, rubber materials, elastomer/tackifier compositions, polymers whose Tg is less than 35° C., semi-solid and solid resins, starches and starch-based polymers, hydrogels, low temperature waxes and thickened or gelled masses of one or more monomers, oligomers, prepolymers or mixtures thereof. In certain applications, it is desirable that the carrier be an adhesive or have latent adhesive properties. With those carriers where force is necessary to flow or deform the carrier, such force must be of at least 1 psi. It is also preferred that the curative dispersed or entrained in the carrier be substantially non-migratory in said carrier and/or that the capsule wall be substantially impermeable to the curative. For ease of use and more homogeneous distribution, it is especially desirable that the curative and carrier be miscible with one another. Generally speaking, the curative is present in an amount of from about 0.1 wt. percent to about 25 wt. percent based on the total weight of the encapsulated cure system and/or the shell comprises from about 0.8 wt. percent to about 25 wt. percent of the encapsulated cure system.

In an alternate embodiment, the encapsulated cure system of the present invention comprises (a) a carrier material, (b) a curative contained in said carrier material, and (c) a polymer capsule encasing said carrier material wherein the carrier is a natural or synthetic material or composition that is substantially non-flowing in the absence of external forces or elevated temperatures which carrier material is formed in-situ, concurrent with or subsequent to encapsulation, from a liquid carrier precursor composition having dispersed or dissolved therein the curative.

The present invention also pertains to the methods by which the foregoing encapsulated cure systems are prepared. Such methods include the (1) encapsulation of a non-liquid carrier particle having contained therein the curing agent, (2) the encapsulation of a dispersion of a heat and/or shear sensitive material in which the curing agent is dispersed or dissolved, said heat and/or shear sensitive material being solid or viscous at room temperature and/or in the absence of high shear forces but liquid or flowable at an elevated temperature and/or when subjected to high shear forces, and (3) the encapsulation of a dispersion of liquid beads of a liquid precursor composition in which the curing agent is dissolved or dispersed, which precursor composition cures or polymerizes without consuming any of the curing agent or, if the curing agent is consumed, without consuming all or substantially all of the curing agent. In one aspect of the latter method, the cure of the precursor composition occurs in-situ, concurrent with or subsequent to the formation of the capsule wall. Said curing may be effected, in whole or in part, by the curing agent to be encapsulated or, preferably, by another curing agent suitable for effecting cure or polymerization of the polymerizable or curable components of the carrier precursor composition. Additionally, the second and third methods mentioned above may involve materials or precursor compositions that (a) are inherently or include components that are latent gelling and/or thickening agents or (b) form such gelling or thickening agents in-situ. Such thickening or gelling agents may be temperature dependent or time and shear dependent or react to form a gel in-situ.

More specifically, the present invention is directed to a method of making an encapsulated cure system for effecting polymerization of a curable composition wherein the method comprising the steps of:

a) homogeneously dispersing or dissolving a curative in a monomer, oligomer and/or prepolymer composition for which said activator is substantially inactive, b) creating fine droplets of the composition of (a), c) polymerizing said droplets and, d) encapsulating the polymerized droplets in a breakable polymeric material. Various methods may be employed for creating the aforementioned droplets including precipitation polymerization, solution polymerization, suspension polymerization and dispersion polymerization.

In another embodiment the method may comprise the steps of:

a) homogeneously dispersing or dissolving a curative in a monomer, oligomer and/or prepolymer composition for which said activator is substantially inactive, b) creating fine droplets of (a), c) encapsulating the fine droplets of (a) in a second polymerizable material and d) polymerizing said second polymerizable material prior to or concurrent with the polymerization of the encapsulated droplets. Here encapsulation may be accomplished by coacervation, interfacial polymerization, air suspension, centrifugal extrusion, spray drying, pan coating, or by adding the fine droplets of (a) to a dispersion of the second polymerizable material and applying a pressure shock wave to the dispersion.

In yet another embodiment, the method of making the encapsulated cure system comprises the steps of:

a) homogeneously dispersing or dissolving a curative in a monomer, oligomer and/or prepolymer composition for which said activator is substantially inactive, b) polymerizing the composition of (a), c) converting the polymerized composition of (a) to a particulate form and d) encapsulating the particles in a breakable polymeric material.

Alternatively the method may comprise the steps of:

a) homogeneously dispersing a curative in a melt of a heat sensitive material which is non-reactive with the curative, b) creating a dispersion, emulsion or suspension of the melt in a liquid medium suitable therefore, c) encapsulating the so formed beads of the melt in a breakable polymeric material, and d) lowering the temperature of the solution to harden the melt prior to, concurrent with or subsequent to the encapsulation step.

The present invention also pertains to curable and polymerizable compositions comprising the above-mentioned encapsulated cure systems. Such curable and polymerizable compositions may be in the form of one-part (one-package) liquid curable systems having the encapsulated cure system dispersed in the liquid curable component. Alternatively, the curable and polymerizable compositions may be a dry blend of encapsulated cure system particles and encapsulated curable component particles. Still further, such curable compositions according to the present invention may comprise a liquid binder containing a mixture of encapsulated cure system particles and encapsulated curable and/or polymerizable component particles. The present invention also pertains to substrates having the last mentioned curable/polymerizable compositions pre-applied thereto and methods of activating such curable/polymerizable compositions.

More specifically the present invention is also directed to curable and polymerizable compositions comprising one or more curable or polymerizable monomers, oligomers and/or prepolymers and one or more encapsulated curatives, as described above, wherein at least one of the encapsulated curatives comprises (a) a carrier material, (b) a curative contained in said carrier material, and (c) a polymer capsule encasing said carrier material wherein the carrier material is a natural or synthetic material or composition that is substantially non-flowing in the absence of external forces or elevated temperatures. Preferably, the carrier material is (a) soft, putty-like or gel-like in character, (b) a solid or semi-solid that is (i) soluble in or is softened by a liquid curable matrix component of the curable composition with which they are to be used, (ii) softened by the reaction and/or environmental conditions under which the curable composition is cured or polymerized or (iii) is softened by the method or process by which the curative is to be made available to the curable, polymerizable or cross-linkable component of said adhesive or sealant. Such carrier materials may include or comprise one or more thixotropic, non-thixotropic gelling or non-thixotropic thickening agents, particularly those which may be slow acting or latent in nature, or the foregoing may be generated in-situ in the carrier concurrent with or following encapsulation of the carrier material. Suitable curable or polymerizable monomers, oligomers and/or prepolymers include those that undergo vinyl polymerization, i.e., those having at least one vinyl group $CH2=CH-$ and/or reactive unsaturation (i.e., $-C=C-$); unsaturated polyesters; urethanes; epoxy resins; polysulfides; isocyanates; silicones; polyethers, polyurethanes and polyolefins having silanol moieties capable of undergoing silanol condensation or hydrosilation reactions; and phenoxy resins. In its preferred embodiment, the curative dispersed or entrained in the carrier is substantially non-migratory in said carrier and/or that the capsule wall is substantially impermeable to the curative and/or the polymerizable components.

In following, the present invention is also directed to such polymerizable compositions wherein only one of the curatives necessary for effectuating polymerization, cure or cross-linking of the curable composition is contained in the encapsulated carrier and any other curatives that may be necessary are either dispersed or dissolved in the curable components or are inherently present on the substrate surface to which they are to be applied. In yet another alternative embodiment, the curable composition comprises at least two different encapsulated cure systems each comprising a different carrier material and/or a different curative. An especially important feature of the present invention is that no or substantially no polymerization, cure or cross-linking of the curable components takes place, even if the capsule wall of the encapsulated cure system of the present invention is breached unless and until conditions are attained for releasing or exposing the entrained curative in the carrier to the curable components of the curable composition and, if necessary, the remaining curatives needed to complete or activate the cure system.

In yet another embodiment, the present invention relates to curable compositions that may be pre-applied to a substrate, which may be in the form of an industrial or commercial stock material, article of manufacture, etc., wherein the curable components thereof are also encapsulated. In such embodiments, the various encapsulated components are dispersed in a suitable binder for applying or holding the same to the substrate.

The present invention also relates to substrates, which may be in the form of an industrial or commercial stock material, article of manufacture, etc., that have applied thereto a pre-applied curable composition of the types mentioned above.

In yet another aspect, the present invention relates to industrial bonding processes wherein the encapsulate cure systems described above and the curable compositions comprising the same, also as mentioned above, are employed.

DETAILED DESCRIPTION

Curing agents suitable for use in the practice of the present invention vary widely. Selection of the specific curing agent depends upon the chemistry of the curable or polymerizable adhesive and/or sealant material, the nature or cure mechanism of the adhesive or sealant to be cured, the method and/or conditions by which the curing agent and/or polymerization or cure of the adhesive or sealant is to be effectuated, the end-use application and/or the nature of the substrate to which the adhesive or sealant is to be applied, and the compatibility of the curing agent with the carrier, its precursors and/or the encapsulating material. One class of curing agents includes those involved with the cross-linking of polymer and pre-polymer materials including curatives and hardeners as well as agents used in conjunction therewith for initiating, accelerating, catalyzing, etc. the cross-linking or hardening of such materials. Another class of curing agents include those involved with the polymerization of one or more polymerizable monomers, prepolymers and/or low molecular weight polymers including, for example, activators, co-activators, accelerators, co-accelerators, catalysts, co-catalysts, initiators and co-initiators; especially those involved with free-radical polymerization. For convenience, unless otherwise stated herein, the terms "curative(s)" and "curing agents" shall, when used herein and in the appended claims, mean all such agents. Specific examples of the various curatives are disclosed in more detail below in relation to the discussion on the various adhesive and sealant systems with which they are employed.

The polymerizable or curable or cross-linkable adhesive and sealant compositions, of which the curative forms a part, suitable for use in the practice of the present invention also vary widely. Selection of the specific adhesive or sealant composition depends upon the end-use application to which it is applied and the environment that it will experience, the cure mechanism to be employed, the process or method by which the curative is to be made available to the curable, polymerizable or cross-linkable component of said adhesive or sealant, as well as the compatibility thereof with the carrier to be used. Generally speaking, the present invention is applicable to most one-part and two- or more part adhesive and sealant compositions, as more fully disclosed in this specification. While encapsulation is not currently used for traditional one-part, liquid systems, the present invention allows one to apply a one-part, liquid system to a substrate which, during processing of the substrate, is exposed to conditions that would or might otherwise initiate or cause polymerization or cure of the one-part system. For example, a heat curable one-part adhesive or sealant may be pre-applied to a substrate which, during processing, but before cure or polymerization is desired, is subjected to heat otherwise sufficient to initiate cured or polymerization of the one-part system. For convenience, unless otherwise stated, the term "curable composition(s)" shall, when used herein and in the appended claims, mean all such curable, polymerizable and/or cross-linkable adhesive and sealant compositions. In the same light, unless the context of the text or claim makes clear that the specified term is being employed in its traditional meaning, the terms "cure", "polymerize" and "cross-link" shall be used interchangeably in this specification and in the appended claims.

The carrier may be any of a number of different materials depending upon the process and materials to be used for preparing the capsules, the applications to which the cure systems are to be used, the chemistry of the curable compositions in which they are to be employed and the process or method by which the curative is to be made available to the curable, polymerizable or cross-linkable component of said curable composition. Generally speaking the carrier will be selected from natural and synthetic materials or compositions that are (a) soft, putty-like or gel-like in character or (b) solid or semi-solid so long as the solid or semi-solid carrier material is (i) soluble in or is softened by the liquid curable matrix component of the curable composition with which they are to be used, (ii) is softened by the reaction and/or environmental conditions under which the curable composition is cured or polymerized and/or (iii) is softened by the method or process by which the curative is to be made available to the curable, polymerizable or cross-linkable component of said adhesive or sealant. The carrier may be comprised of substantially polymeric or oligomeric components and/or monomeric components provided that the carrier composition itself exhibits the aforementioned characteristics. Furthermore, it is understood that the curing system of the present invention may comprise a mixture of different encapsulated carriers, each containing the same or a different curing agent. It is also contemplated that the carrier may be or may generate in-situ a thixotropic material or latent thixotropic material; however, because of the small particle size of the microcapsules, thixotropy must be inherent or made inherent to the composition or material comprising the carrier. Traditional inorganic thixotropic additives such as fumed silica and the like are, at this time, generally considered inappropriate for use in the preparation of the microencapsulated cure systems of the present invention due to the relatively large particle size of current day inorganic thixotropic additives as compared to the particle size of the microencapsulated cure systems. Alternatively, or in addition, the carrier composition may include or comprise one or more non-thixotropic gelling or thickening agents that act latently such that the carrier or carrier precursor material immediately prior to or during the encapsulation process is of a low viscosity and following encapsulation is of an increased viscosity, generated in-situ. As used in this application and the appended claims, the terms "soft" and "putty-like" mean that the referenced materials do not flow or deform without moderate force, generally without a force of at least 1 psi, preferably at least 5 psi. These soft or putty-like materials may have no or little to moderate elasticity, preferably a consistency and degree of elasticity of from that of cake frosting to that of bread dough, so that as sufficient and repetitive forces are acted upon the encapsulated carrier, more of the curative within the carrier material is exposed and/or made available. Similarly, reference to softening of the carrier material means that the carrier material becomes soft or putty-like or even flowable upon exposure to certain materials and/or conditions including, for example, upon exposure to the liquid components of the curable composition in which the carrier is wholly or partly soluble, miscible or swellable or to heat or by mastication in the case of a rubbery carrier material.

Exemplary of the materials that may be suitable for use as a carrier include any of a number of low Tg materials including hot melts, pressure sensitive adhesives, rubber materials and other low Tg polymers, semi-solid and solid resins, starches and starch-based polymers, hydrogels, and low temperature waxes provided that the foregoing meet one or more of the aforementioned characteristics and do not interfere with the cure or polymerization or cross-linking of the curable compositions or materially degrade the desired adhesive or sealant properties of the so cured, polymerized or cross-linked compositions.

The carrier may also comprise or include organic and inorganic thixotropic, thickening and gelling agents, particularly those used commercially to control the flow and rheology characteristics of, for example, paints, adhesives, sealants, engine and industrial oils, and food products. Suitable organic polymeric thickening or gelling agents include styrene/olefinic block copolymers sold under the Kraton brand, and a variety of small molecules that can associate chemically or physically, such as various plasticizers, thickeners, flow control agents, and the like. As noted previously, current conventional inorganic thixotropic, thickening and gelling agents are typically not suitable for use in the preparation of the microencapsulated cure system unless the particle size of such inorganic additive is extremely small and the particle size of bead of the carrier material or carrier precursor material to be encapsulated is very large. However, should technology evolve whereby nano-sized inorganic thixotropic, thickening and gelling agents are capable of being produced, it is certainly contemplated that those materials will have applicability in the practice of the present invention.

On the other hand, it is also contemplated that the carrier or the components thereof may be co-reactive with the curable composition and/or the curative. For example, with respect to the former, the carrier may have a functional group that serves as a reactive or cross-link site with and during polymerization or cure of the polymerizable monomers, pre-polymers and/or polymers of the curable composition. Alternatively, and preferably, the carrier composition may comprise (a) a mixture ("mixture (a)") of one or more liquid mono- and/or polyfunctional monomers, oligomers and/or prepolymers that copolymerize with the liquid curable components of the curable compositions and (b) a viscosity modifier which is (i) a slow acting, latent gelling or thickening agent, (ii) a temperature activated gelling or thickening agent (no gel at elevated temperatures) and/or (iii) a shear sensitive gelling or thickening agent. In this embodiment, the carrier composition is subjected to conditions whereby the composition is of low viscosity, i.e., where the viscosity modifier has no or substantially no effect, at that point during the encapsulation process wherein the fine beads or droplets of the mixture (a) are prepared for encapsulation and returns to or becomes of a much higher viscosity, exhibiting the characteristics of the carrier as defined earlier, subsequent thereto. For example, the elevated temperature or shear forces which lower the viscosity may be removed following formation of the droplets and prior to, concurrent with, or subsequent to the application or deposit of the shell wall or shell wall forming material. Alternatively, following formation of the droplets, the emulsion, dispersion, suspension, colloid, etc. of the mixture (a) may be subject to such conditions as effectuate or accelerate the gelling or thickening properties of the latent gelling or thickening agent Employing carriers comprised of the mixture (a) has the added benefit of maximizing the amount of liquid curable components in the final curable composition and minimizing the amount of other inert ingredients and/or ingredients which may affect the properties of the cured or polymerized curable composition.

It should be noted that where the carrier is a thickened or gelled or thixotropic material, the viscosity at the time of formation of the beads is low such that low or moderate shear forces create fine droplets, consistent with the desired particle size and particle size distribution of the to be formed encapsulated cure system. In their thickened, gelled or thixotropic state, the viscosity is such that even moderate to high shear forces will not allow for the preparation of a fine, preferably substantially uniform, droplets or for droplets having a very narrow and traditional bell curve particle size distribution.

As noted above, the curative may also take part in the polymerization of certain or all components of the carrier composition provided that the amount of curative incorporated into the carrier precursor composition is sufficient so that adequate amounts remain following completion of the polymerization of the carrier so as to be able to effectuate cure of the curable composition. Preferably, though, the curing agent for the curable composition is not, or is not to any meaningful extent, involved with the cure or polymerization of the carrier. Instead, the carrier precursor composition includes one or more other curing agents, leaving the encapsulated curing agent available for effecting cure or polymerization of the curable composition. In any event, it is important that the curative to be incorporated into the carrier not react with the carrier once formed so as to ensure long-term shelf stability and efficacy of the curative in the encapsulated carrier. Of course, the curative may, and most likely is, involved with the chemical reaction between the carrier and the curable components of the curable composition, if any. The key is that the curative not be reactive with the carrier in its encapsulated form.

Furthermore, the carrier may have incorporated therein other components of the adhesive or sealant or other additives pertinent to the carrier itself including, for example, plasticizers to enhance the pliability or softness of the carrier and/or tackifier resins. Again, however, it is important that such other components not interfere with the cure or polymerization or cross-linking of the curable compositions or materially degrade the desired adhesive or sealant properties of the so cured, polymerized or cross-linked compositions. Suitable plasticizers include phthalates, adipates, hydrocarbon resins, oils, and fatty acid esters, including, for example, methyl palmitate and methyl stearate. Especially preferred plasticizers are those based on polybutenes and combinations thereof alone or together with other additives such as aliphatic lactate esters as taught in Wyffels (U.S. Pat. No. 5,688,850), incorporated herein by reference. Suitable tackifier resins include aliphatic and/or aromatic hydrocarbon resins and terpene resins.

While the carrier may be an inert material from the perspective of bonding or sealing, it is preferred that the carrier itself participate in the bonding or sealing performance of the overall adhesive or sealant system in which it is incorporated. Specifically, it is oftentimes desirable for the carrier to possess inherent or latent adhesive or sealant properties. For example, the carrier may be or contain a hot melt adhesive, a pressure sensitive adhesive, an elastomer/tackifier composition, a thickened or gelled mass of one or more monomers, oligomers or mixtures thereof, etc. By employing a carrier which has adhesive characteristics, the carrier is able to provide an initial and immediate bond between two substrates to be bonded, holding the two in proper alignment while providing sufficient time for the curable composition to cure, polymerize or cross-link, as appropriate. This is particularly beneficial in high speed, industrial bonding applications where only a very brief time, on the order of fractions of a second, are possible to apply pressure between the two substrates to be bonded. This attribute is of even greater significance in those instances where the substrates to be bonded have forces, whether inherent in the product design and/or materials of which they are made, etc., that, in the absence of an immediate tack bond, would cause the two substrates to come apart: thus, making a bond impossible. For example, in bonding opposing end flaps of a cereal box whose natural tendency is to open, the use of a carrier with adhesive characteristics will hold the flaps together while the curable or polymerizable material cures or polymerizes to form the formal bond.

It is also contemplated that the curing system of the present invention may comprise a mixture of two or more different microencapsulated carriers each containing the same or a different curing agent and/or carrier material. For example, one may tailor the adhesive characteristics contributed by the carrier by employing a combination of carrier particles, some of which contain a higher percentage of material with latent adhesive properties and others with a carrier material of low or no adhesive properties. Alternatively, a portion of the carrier particles may comprise a gel containing a mixture of mono- and/or or poly-functional monomers that are co-polymerizable with the curable composition and the remainder comprise an adhesive. Such compositions provide limited, quick bonding capability with more liquid curable components so as to enhance the adhesive composition while lessening the amount of non-participating, non-reactive carrier. In essence, the use of mixtures of different carrier particles enables one to balance the immediate and latent adhesive properties of the ultimate adhesive composition.

As noted, the carrier material may be a hydrogel. Suitable hydrogels include, but are not limited to, those derived from gelatin, polysaccharides, alginates, cross-linked polyacrylamide polymers, hydroxyethylmethacrylate polymers, crosslinked polyhydroxyethylacrylate, polymerized, crosslinked 2-acrylamido-2-methylpropane sulfonic acid polymers and their salts, including particularly the sodium and potassium salts, crosslinked polyvinylpyrrolidone, polyacrylic acid, copolymers of the foregoing with each other and/or other polymers such as polystyrene or other non-hydrogel forming polymers. An exemplary hydrogel is that based on poly-2-hydroxyethylmethacrylate, preferably cross-linked with ethylene glycol dimethacrylate.

The carrier may also be an elastomer composition. Exemplary elastomers are those exhibiting a second order glass transition temperature (Tg), or a softening point, of less than 25° C., preferably less than about 0° C., especially those soluble in (meth)acrylate ester monomers. Such elastomers are synthetic high polymers with exhibit plastic flow, particularly, polychloroprene and copolymers of butadiene or isoprene with styrene, acrylonitrile, (meth)acrylate esters, and the like. Additional useful elastomers include copolymers of ethylene and (meth)acrylate esters, homopolymers of epichlorohydrin and copolymers of epichlorohydrin and ethylene oxide. Specific examples include CR-neoprene-polychloroprene, NBR-nitrile rubber-butadiene-acrylonitrile copolymer, styrene-butadiene copolymer, acrylic rubber acrylate butadiene copolymer, and copolymers of ethylene and acrylate esters such as methylacrylate and ethylacrylate. Of course, higher Tg materials may be used, especially where the curable composition is to be activated at higher temperatures or otherwise experiences higher temperatures during activation, e.g., where friction of mixing or the mixer element creates higher temperatures. Also included in this class of materials are the so-called rubber resin adhesives which comprise an elastomeric ingredient such as crude natural rubber, styrene-butadiene elastomer, a polybutadiene, polyisobutylene and polysiloxane and a tackifying resin such as glyceryl esters of hydrogenated rosin, thermoplastic terpene resins, petroleum hydrocarbon resins, coumarone-indene resins, synthetic phenol resins, low-molecular weight polybutenes and tackifying silicone resins.

The carrier may also be an adhesive or pressure sensitive adhesive material having a low Tg or low softening point, preferably less than 25° C. and having an elastic modulus of less than about $5 \times 10^5$ dynes/cm2 at 70° C., as measured using a dynamic mechanical thermal analyzer Model RSA II (available from Rheometrics Co.). Suitable adhesives include the acrylate-based pressure sensitive adhesives, particularly those that generally do not require the addition of a tackifier resin. Such acrylates typically have alkyl chains of from 1 to 14 carbon atoms per molecule, preferably from 4 to 12 carbon atoms per molecule. A mixture of different acrylate monomers may be used, but at least a major portion of the alcohol residue forming the alkyl tails of the molecules generally have carbon-to-carbon chains of at least four carbon atoms terminating at the ester linkages. Examples of useful acrylate-based polymeric materials are the homo- and co-polymers of methyl isoamylacrylate, isooctyl acrylate, commercial fuse oil acrylate and 2-ethylhexylacrylate. The copolymers may include acrylic acid, methacrylic acid, acrylamide, methacrylamide, acrylonitrile and methacrylonitrile as co-monomers. Other acrylic materials include multi-component compositions comprising, for example, a low Tg acrylate monomer such as n-butyl acrylate, ethyl acrylate, 2-methylbutyl acrylate, isobutyl acrylate, isooctyl acrylate, 2-ethyl hexyl acrylate and the like, a functional monomer such as N,N-dimethyl (meth)acrylamide, N,N-diethyl(meth)acrylamide, N-vinylpyrrolidone and the like, and a higher Tg acrylate monomer such as 3,5-dimethyladamantyl(meth)acrylate, isobornyl(meth)acrylate, 4-bipheny(meth)acrylate, and 2-nephthyl(meth)acrylate. Still another class of pressure sensitive materials are the acrylic hot melt PSAs of Mancinelli (U.S. Pat. No. 5,225,470), incorporated herein by reference.

The present invention is particularly suited for those carrier materials, particularly pressure sensitive adhesive materials, that are polymerized in-situ, i.e., concurrent with or subsequent to, encapsulation of the carrier. Exemplary systems include those disclosed in, for example Schwantes (U.S. Pat. No. 6,592,990) and Nagai et. al. Such systems generally comprise addition polymerizable pre-polymers, including, for example, alkyl(meth)acrylate, aralkyl(meth)acrylate, cycloalkyl(meth)acrylate, alkoxy(meth)acrylate, cycloalkoxy(meth)acrylate, bicycloalkyl(meth)acrylate, and alkoxy(alkoxy)$_n$(meth)acrylate. The alkyl moieties should be selected preferably of 1 to 16 carbons, the cycloalkyl moieties from 4 to 8 carbons, and n is an integer from 1 to 6.

More particularly suitable addition polymerizable prepolymers include those whose homopolymer has a Tg of less than about 0° C., a flash point of at least 75° C., and a boiling point of at least 175° C., including, for example, n-pentyl acrylate, 2-methyl butyl acrylate, 2-ethylhexyl acrylate, n-octyl acrylate, n-decyl acrylate, n-dodecyl acrylate, lauryl methacrylate, lauryl acrylate, 2-ethylhexyl methacrylate, n-octyl methacrylate, iso-octyl acrylate, iso-octyl methacrylate, isononyl acrylate, isodecyl acrylate, 2-ethoxyethyl methacrylate, butyl diglycol methacrylate, tetrahydrofurfuryl acrylate, 2-phenoxyethyl acrylate, isohexyl acrylate, tridecyl acrylate, tridecyl methacrylate, ethoxylated nonyl phenol acrylate and the like and mixtures thereof.

Optionally, the in-situ formed carrier may contain a terpene resin in addition to the polymerizable prepolymer. Terpene resins function as tackifiers and, for purposes of the invention, include wood rosin resins, esters of gum rosin, styrenated terpene and terpene phenolic resins (including CAS #259094-71-8). Examples of terpene resins include modified terpene resins, such as those sold under the Sylvares™ and Zonatac™ tradenames (Arizona Chemical, Panama City, Fla.), as well as the ester-modified or polyol ester modified terpene resins such as Sylvalite™ (CAS#8050-26-8) and the like.

Optionally, the composition from which the in-situ formed carrier is derived may include a second substantially water insoluble polymerizable pre-polymer which pre-polymer is multifunctional having at least two addition polymerizable sites. By "substantially water insoluble" is meant that the material has a solubility in water of less than about 2%, more preferably less than 1%, by weight. The addition polymerizable sites of said prepolymers interact with other addition polymerizable sites in the transformation of the pre-polymers to an encapsulated tacky adhesive material. Exemplary second substantially water insoluble polymerizable pre-polymers include allyl methacrylate, alkene glycol dimethacrylate, alkyl dimethacrylate, alkyldiol dimethacrylate, alkoxy alkanol diacrylate, trialkanol triacrylate, alkoxy(alkoxy)$_n$ alkyl triacrylate, alkoxy(alkoxy)$_n$ alkyl dimethacrylate, aralkyl dimethacrylate, cycloalkyl dimethacrylate, alkoxy dimethacrylate, bicycloalkyl dimethacrylate, cycloalkoxy dimethacrylate, allyl acrylate, alkene glycol diacrylate, alkyl diacrylate, alkyldiol diacrylate, alkoxy alkanol dimethacrylate, trialkanol trimethacrylate, alkoxy(alkoxy), alkyl trimethacrylate, alkoxy(alkoxy)$_n$ alkyl diacrylate, aralkyl diacrylate, cycloalkyl diacrylate, alkoxy diacrylate, bicycloalkyl diacrylate, cycloalkoxy diacrylate, wherein the alkyl moieties are of 1 to 16 carbons, the cycloalkyl moieties are of 4 to 8 carbons, n is an integer from 1 to 6. More specifically, the second substantially water insoluble polymerizable pre-polymer having at least two addition polymerizable sites can be selected from any of allyl methacrylate; triethylene glycol dimethacrylate; ethylene glycol dimethacrylate; tetraethylene glycol dimethacrylate; polyethylene glycol dimethacrylate; 1,3 butylene glycol diacrylate; 1,4-butanediol dimethacrylate; 1,4-butanediol diacrylate; diethylene glycol diacrylate; diethylene glycol dimethacrylate; 1,6 hexanediol diacrylate; 1,6 hexanediol dimethacrylate; neopentyl glycol diacrylate; neopentyl glycol dimethacrylate, polyethylene glycol diacrylate; tetraethylene glycol diacrylate; triethylene glycol diacrylate; 1,3 butylene glycol dimethacrylate; tripropylene glycol diacrylate; ethoxylated bisphenol diacrylate; ethoxylated bisphenol dimethacrylate; dipropylene glycol diacrylate; alkoxylated hexanediol diacrylate; alkoxylated cyclohexane dimethanol diacrylate; propoxylated neopentyl glycol diacrylate, trimethylolpropane trimethacrylate; trimethylolpropane triacrylate, pentaerythritol triacrylate, ethoxylated trimethylolpropane triacrylate, propoxylated trimethylolpropane triacrylate, propoxylated glyceryl triacrylate, di-(trimethylolpropane)tetraacrylate, dipentaerythritol pentaacrylate, ethoxylated pentaerythritol tetraacrylate, and the like, and mixtures thereof.

The second substantially water insoluble polymerizable pre-polymer can have at least three different mechanisms for forming a tacky adhesive with the first pre-polymer. The second polymerizable pre-polymer can have two reactive sites or polyfunctional sites for reacting with the first pre-polymer. Alternatively, the second pre-polymer can be selected to have polar groups such as oxygen, amine, ether, ester, alcohol, ketone, hydroxy, epoxy, carboxylic acid, or aryl acid, without limitation, for purposes of hydrogen bonding with other polar groups of the adhesive forming polymer. Yet a third alternative is to select the second pre-polymer such that it stericly entangles or hinders the movement of opposing chains of the adhesive being formed.

Suitable second substantially water insoluble polymerizable pre-polymers having polar groups can be selected from the group consisting of alkoxy(meth)acrylates, polyester (meth)acrylate, alkoxy(alkoxy)$_n$ alkyl(meth)acrylate, (meth)acrylalkoxy phthalic acid, glycidyl(meth)acrylate, cycloalkoxy(meth)acrylate, and acyloxy(meth)acrylate wherein said alkyl moieties are from one to sixteen carbons, wherein the cycloalkyl moieties are from four to eight carbons, wherein n is an integer from one to six. Specific examples of the second substantially water insoluble polymerizable pre-polymer includes materials selected from the group consisting of butyl diethyleneglycol methacrylate, 2-methoxyethyl acrylate; 2-ethoxyethyl methacrylate; butyl diglycol methacrylate; t-butylaminoethyl methacrylate; 2-(2-oxoimidazolidin-1-yl-ethyl)methacrylate; tetrahydrofurfuryl methacrylate; tetrahydrofurfuryl acrylate; 2-phenoxyethyl acrylate; 2-phenoxyethyl methacrylate; glycidyl methacrylate; ethoxylated nonyl phenol acrylate; ethoxylated hydroxyethyl methacrylate; alkoxylated tetrahydrofurfuryl acrylate; ethoxylated nonyl phenol methacrylate; alkoxylated nonyl phenol acrylate; caprolactone acrylate; 2-acryloxy ethoxy-o-phthalic acid; 2-acryloxy-1-methylethoxy-o-phthalic acid and 2-acryloxy-1-methylethoxy-o-dihydro-(3,6)-phthalic acid.

As stated above, another alternative for the second substantially water insoluble polymerizable pre-polymers are pre-polymers that result in steric entanglement or that stericly hinder the movement of opposing chains of the adhesive forming polymer. Such prepolymers include, for example, alkyl(meth)acrylates of greater than 14 carbons, cycloalkyl (meth)acrylates, multicyclic alkyl(meth)acrylate, aralkyl (meth)acrylate, and cycloalkoxy(meth)acrylate, wherein the alkyl moieties are of at least 14 carbons, and wherein the cycloalkyl moieties are of at least 6 carbons. Exemplary of the substantially water insoluble polymerizable pre-polymer which stericly hinders the first water insoluble polymerizable pre-polymer are stearyl acrylate; stearyl methacrylate; acrylate C 18-22, dicyclopentenyloxyethyl methacrylate; dicyclopentyl oxyethyl methacrylate; isobornyl methacrylate; isobornyl acrylate; benzyl acrylate; benzyl methacrylate; cyclohexyl acrylate; cyclohexyl methacrylate; and cetyl acrylate. Some of the materials identified as participating in hydrogen bonding earner, such as tetrahydrofurfuryl methacrylate, tetrahydrofurfuryl acrylate, 2-phenoxy ethyl acrylate and 2-phenoxy ethyl methacrylate can also function as stericly hindering pre-polymers.

For effecting in-situ polymerization of the carrier, the carrier precursor composition typically includes a catalytically effective amount of a substantially water insoluble free radical initiator along with the addition polymerizable pre-polymer(s) and, if present, solvent. The solvent provides a medium in which the various prepolymer materials can undergo polymerization. Suitable solvents include petroleum oils, vegetable oils, vegetable oil esters, liquid hydrocarbon resins, liquid plasticizers and blends thereof. The free radical initiator is selected to have a half-life of at most 10 hours at 25° C., and more preferably at most 1 hour at 25° C. The free radical initiator needs to be soluble in the polymerizable pre-polymer material and solvent. The free radical initiator can be selected from the group of initiators comprising an azo initiator, peroxide, dialkyl peroxide, alkyl peroxide, peroxyester, peroxycarbonate, peroxyketone and peroxydicarbonate. More particularly the free radical initiator is selected from 2,2'-azobis(isobutylnitrile), 2,2'-azobis(2,4-dimethylpentanenitrile), 2,2'-azobis(2,4-dimethylvaleronitrile), 2,2'-azobis(2-methylpropanenitrile), 2,2'-azobis(methylbutyronitrile), 1,1'-azobis(cyclohexanecarbonitrile), 1,1'-azobis (cyanocyclohexane), benzoyl peroxide, decanoyl peroxide; lauroyl peroxide; benzoyl peroxide, di(n-propyl)peroxydicarbonate, di(sec-butyl)peroxydicarbonate, di(2-ethylhexyl)

peroxydicarbonate, 1,1-dimethyl-3-hydroxybutyl peroxyneodecanoate, α-cumyl peroxyneoheptanoate, t-amyl peroxyneodecanoate, t-butyl peroxyneodecanoate, t-amyl peroxypivalate, t-butyl peroxypivalate, 2,5-dimethyl 2,5-di (2-ethylhexanoyl peroxy)hexane, t-amyl peroxy-2-ethylhexanoate, t-butyl peroxy-2-ethylhexanoate, t-butyl peroxyacetate, di-t-amyl peroxyacetate, t-butyl peroxide, di-t-amyl peroxide, 2,5-dimethyl-2,5-di-(t-butylperoxy)hexyne-3, cumene hydroperoxide, 1,1-di-(t-butylperoxy)-3,3,5-trimethyl-cyclohexane, 1,1-di-(t-butylperoxy)-cyclohexane, 1,1-di-(t-amylperoxy)-cyclohexane, ethyl-3,3-di-(t-butylperoxy)-butyrate, t-amyl perbenzoate, t-butyl perbenzoate and ethyl 3,3-di-(t-amylperoxy)-butyrate.

In yet another alternative embodiment of the present invention, the carrier material may be one that is heat sensitive, i.e., one that transforms from a solid or semi-solid state to a liquid or putty-like state upon exposure to relatively low temperatures. In particular, such carriers have a melting point or range above ambient temperature (~25° C.) and are substantially insoluble in the encapsulating medium and, preferably, will have substantial, or at least partial, solubility in the curable composition at temperatures above the melting point, or in and above the melting range. Preferably the disperse phase has a melting point or range in the range 35° C.-150° C., more preferably in the range 40° C.-85° C. Suitable heat sensitive carrier materials include polyethylene glycols, preferably having molecular weights in the range 4000 to 20,000; acid waxes; stearic acid and stearates. A particularly suitable material is polyethylene glycol of average molecular weight 4000, which is a wax. Other suitable materials are described in Cooke et. al. (U.S. Pat. Nos. 4,497,916 and 3,547,851), incorporated herein by reference.

Finally, other suitable carriers include, for example, the core materials disclosed in Gosiewski et al. (U.S. Pat. No. 5,206,288), Cahalan et. al. (U.S. Pat. No. 4,768,523), Sataki et. al. (U.S. Pat. No. 5,814,685), Everaerts et, al. (U.S. Pat. Nos. 5,905,099 and 5,612,136), Mudge (U.S. Pat. No. 4,908, 268), Sanderson at al. (U.S. Pat. No. 4,077,926), Mancinelli (U.S. Pat. Nos. 5,225,470 and 5,006,582), Iovine et. al. (U.S. Pat. No. 4,721,748), and Petras et. al, (U.S. Pat. No. 4,061, 826), all of which are herein incorporated by reference.

The cure system of the present invention also includes a polymer shell encasing the carrier particle. Suitable materials for forming the polymer shell include any of those know in the art for encapsulation, particularly the encapsulation of liquid droplets or solid particles. Selection of the encapsulating material is dependent upon the desired properties of the shell wall, the chemical composition of the carrier or, in the case of a carrier to be cured or polymerized in-situ after or concurrent with formation of the shell, the carrier precursor materials, including the curative, and the method employed for the encapsulation process. It is also important that the composition of the shell wall be such that it is impermeable to the curative, particularly where the carrier is of a composition that allows for the migration of the curative within the carrier or the blooming of the curative from within the carrier.

The shell wall may be a rigid material or a flexible material so long as the wall ruptures under the conditions for initiating polymerization, curing or cross-linking of the curable composition. For the purpose of this application, it is understood that reference herein to "initiation" or "initiating" polymerization, curing or cross-linking includes that step where the curative is brought into direct contact with or otherwise made available to the polymerizable components of the curable composition, regardless of whether actual polymerization, curing or cross-linking is concurrently effected. For example, in activated anaerobic curable compositions, the polymerization is initiated; however, polymerization does not occur in the presence of air due to oxygen inhibition. Similarly, a heat activated curative may be intimately mixed with the curable component of the curable composition, but polymerization does not occur until the proper temperature is attained to effectuate heat activation. In essence, but for the absence of a physical or environmental condition or a chemical co-reactant which is inherently supplied by the substrate upon which the adhesive is applied or to be applied, polymerization or cure would commence.

The thickness of the shell wall may vary widely and may range from an extremely thin film that provides no or little structural effect but merely serves as an impermeable or low permeability barrier for the curative to a shell wall having structural integrity of its own. Such thin walls are particularly suitable for those curing systems wherein the carrier is a stiff or rigid material. Alternatively, thicker shell walls may be employed, especially where the microcapsules during the formulation or application of the adhesive or sealant composition or the substrates to which it is applied are subject to extensive shear conditions, strong forces, excessive handling, etc. Thicker walls are also appropriate where the carrier is very soft or thixotropic in nature and, by itself, provides little or less than desired resistance to deformation.

Permeability refers to the ability of the shell wall to provide adequate protection against the ingress and/or egress of materials into or from the microcapsule that may otherwise affect the shelf life of the microcapsules and/or the adhesive or sealant formulation into which they are incorporated. Thus, the shell wall may be permeable to certain materials so long as it does not adversely affect the utility and efficacy of the microcapsules for their defined life, which life is typically three months, preferably six months or more.

Generally speaking, it is an objective of the present invention to employ thin shell walls, especially shell walls thinner than are traditionally used for or found with current microencapsulated one-part adhesive systems; though, of course, such thinner walls are not required and traditional thickness walls may also be used. However, the use of thin shell walls is especially desirable as their use means that more of the components necessary for forming the adhesive or sealant and less inert, filler material, as represented by the shell wall, are present in a given volume of adhesive or in the bond site. Typically, in accordance with the practice of the present invention, the shell wall will comprise from about 0.8 wt. percent to about 25 wt. percent, preferably from about 2 wt. percent to about 12 wt. percent, most preferably from about 4 wt. percent to about 10 wt. percent of the whole of the curing system.

The cure systems of the present invention are prepared in a two-step process, the first being the incorporation of the curative in the carrier and the second the encapsulation of the modified carrier. As will be readily apparent to those skilled in the art, any number of a variety of methods may be used for accomplishing both of these steps. However, the selection of the specific processes will depend upon a number of factors including, in particular, the materials to be used and the point at which the curative is to be incorporated into the carrier.

The curative may be incorporated into the carrier material in a number of different ways depending upon the selection of curative and carrier materials and the ability and manner by which such carrier materials are converted into particle form. In one embodiment where the carrier is a solid or semi-solid material, the curative is compounded or kneaded into the carrier material and, if the resultant material is sufficiently rigid, ground to the desired particle size or if not rigid, frozen and then ground to the desired particle size. For example, the curative may be incorporated a polymer melt of the carrier or, if the carrier were a wax, the curative would be blended into the liquefied wax and then the mix hardened. Yet again, the curative could be kneaded into a soft, pliable or malleable polymeric or elastomeric carrier using a roll mixer, Banbury mixer or the like. In essence any of the known methods for incorporating a solid or semi-solid into another solid or semi-solid may be employed provided that the processing conditions are such as not to adversely affect or degrade the curative.

Where the curative is a liquid or in solution, it is possible to use a solid or semi-solid carrier that absorbs or is swelled by the liquid curative or solvent of the curative solution. In this process, the carrier acts much like a sponge, whereby liquid curative is absorbed into the carrier or, if a solution, the solvent brings the curative into the carrier. In those cases involving a curative solution, the solvent is preferably allowed to evaporate prior to encapsulating, or if the carrier following such evaporation is not in the proper particulate form, grinding the carrier prior to encapsulation. However, it is not always necessary to drive off the solvent or all of the solvent where the solvent of the curative solution acts as a plasticizer for the carrier, thus, softening the carrier to facilitate access to or exposure of the curative upon initiation, without interfering with or having a detrimental impact on the performance or desired properties of the cured adhesive or sealant.

Alternatively, where the carrier itself is in solution, the curative may be added thereto before driving off the solvent and recovering the modified carrier. Alternatively, depending upon the carrier and the nature of the carrier solution, certain additives, pH adjustments and/or temperature changes and the like can be employed to precipitate out the modified carrier, Another approach to the incorporation of the curative into the carrier is by dispersing or dissolving, whether wholly or partly soluble or miscible, the curative in one or more of the precursor materials or reactants that are used to form the carrier material. If the curative is also effective in initiating, accelerating or facilitating the cure or polymerization of the carrier, then sufficient excess of the curative must be used to ensure that adequate curing agent remains in the carrier following its formation. This reaction mix may then be cured or polymerized to form the modified carrier and the so formed mass ground to the desired particle size. Alternatively, the aforementioned reaction mix or the components thereof may be added to an appropriate liquid medium and subjected to shear mixing so as to form a colloidal solution, suspension or emulsion. The colloidal solution, suspension or emulsion may then be subject to the appropriate conditions for effecting cure or polymerization of the reaction mix to form the modified carrier particles prior to encapsulation or an appropriate encapsulating material may be added to the solution for effecting encapsulation of the reaction mix droplets and thereafter forming the capsule or shell wall, with or without concurrent in-situ polymerization or cure of the carrier material. Any of the known methods for encapsulating a liquid may be employed including techniques based on interfacial polymerization, coacervation, and the like.

The amount of curative to be incorporated into the carrier depends upon the specific curative or curatives to be employed and the curable composition with which it is be used, the method by which initiation of cure of the curable composition is to be accomplished, the anticipated weight ratio of curable composition to encapsulated cure system and, as noted above, whether the curative also participates in or is consumed by the cure or polymerization of the carrier material and/or shell wall. Generally speaking, the amount of curative will be consistent with those levels typically used to effectuate cure of the given curable composition. However, where the process by which the carrier and curable composition are mixed involves intimate mixing, e.g., repetitive kneading or mastication, it is often possible to employ lower levels of the curative for the same volume of curable composition due to the more efficient exposure of the curative to the curable components.

When the encapsulated curative is to be employed in addition polymerizable curable compositions, the curative will be present in an amount of from about 0.1 wt. percent to about 25 wt. percent, preferably from about 1 wt. percent to about 20 wt. percent, most preferably from about 5 wt. percent to about 15 wt. percent of the carrier. Higher amounts are also contemplated; however, with such higher amount, less of the encapsulated carrier will be incorporated into the curable composition for a given particle size. Furthermore, since the density of the carrier particles in a curable composition is lessened as the concentration of the curative in the carrier particles increases and/or as the particle size of the carrier particles increase (in order to maintain a given amount of curative for a given volume of curable components), it may be necessary to employ more intimate mixing or kneading of the carrier particles during the activation step to ensure a thorough dispersion/distribution of the curative in the curable composition.

Where the curative is a cross-linking or hardening agent, typically employed with step growth polymerization reactions, the amount of such curatives in the microcapsules will be considerably higher. Such curatives will typically be present in an amount of from about 2 wt. percent to about 50 wt. percent, preferably from about 10 wt. percent to about 30 wt. percent, most preferably from about 15 wt. percent to about 25 wt. percent of the carrier. More importantly, the amount of these curatives typically is dependent upon the stoichiometry requirements for the curable composition and the degree of cross-linking, as appropriate, that may be desired. Thus, higher or lower amounts may be used in the carrier particles with proper adjustment of the amount of carrier particles to be incorporated into a given amount of curable composition.

Generally speaking, the encapsulated carrier microparticles of the present invention serve as microdomains of the curing agent in a highly concentrated amount. Where the curative also serves as the curative for the carrier and/or the microcapsule walls, the curative is typically incorporated at a level that is at least 2 times, preferable at least 5 times and most preferably at least 10 times that necessary for effectuating cure of the carrier and/or wall material. In this instance, the amounts recited in the prior two paragraphs refer to the amount of curative following polymerization and/or cure of the carrier and/or cell wall, as appropriate.

The particle size of the encapsulated cure system of the present invention may vary widely depending upon the intended end-use application, the method by which the cure of the curable composition with which they are to be used is initiated and the constraints of the method by which the particles are formed. Typically, the volume weighted median particle size will range from about 2 microns to about 200 microns, preferably from about 5 microns to about 50 microns, most preferably from about 10 microns to about 20 microns. Volume weighted median particle size is determined using an Accusizer 788, made by Particle Sizing Systems of Santa Barbara, Calif.

As noted above, microencapsulation of the carrier material may be attained through any of the known methods and using any of the known materials. While the following discussion is predominately directed towards the encapsulation of the carrier, the same is equally applicable to the encapsulation of other components of the curable compositions, where desired or applicable, including, specifically, the liquid curable components as discussed further below. Suitable techniques include coacervation, interfacial polymerization, air suspension, centrifugal extrusion, spray drying, pan coating, in-situ polymerization, and by forming a dispersion of core material and shell material and applying a pressure shock wave to the dispersion as described in Redding Jr. (U.S. Pat. No. 5,271,881, incorporated herein by reference). The specific selection of the method and the materials depends upon the nature, including the physical state and/or chemistry, of the material to be encapsulated, e.g., whether the carrier material is in a liquid form or a solid, semi-solid or gel-like particulate form. Exemplary methods and materials are set forth in the following paragraphs as well as in, for example, Schwantes (U.S. Pat. No. 6,592,990), Nagai et. al. (U.S. Pat. No. 4,708,924), Baker et. al. (U.S. Pat. No. 4,166,152), Wojciak (U.S. Pat. No. 4,093,556), Matsukawa et. al. (U.S. Pat. No. 3,965,033), Matsukawa (U.S. Pat. No. 3,660,304), Ozono (U.S. Pat. No. 4,588,639), Irgarashi et. al. (U.S. Pat. No. 4,610,927), Brown et. al. (U.S. Pat. No. 4,552,811), Scher (U.S. Pat. No. 4,285,720), Shioi et. al. (U.S. Pat. No. 4,601,863), Kiritani et. al. (U.S. Pat. No. 3,886,085), Jahns et. al. (U.S. Pat. Nos. 5,596,051 and 5,292,835), Matson (U.S. Pat. No. 3,516,941), Chao (U.S. Pat. No. 6,375,872), Foris et. al. (U.S. Pat. Nos. 4,001,140; 4,087,376; 4,089,802 and 4,100,103), Greene et, al. (U.S. Pat. Nos. 2,800,458 and 2,730,456), Clark (U.S. Pat. No. 6,531,156), Saeki et. al. (U.S. Pat. Nos. 4,251,386 and 4,356,109); Hoshi et. al. (U.S. Pat. No. 4,221,710), Hayford (U.S. Pat. No. 4,444,699), Hasler et. al. (U.S. Pat. No. 5,105,823), Stevens (U.S. Pat. No. 4,197,346), Riecke (U.S. Pat. No. 4,622,267), Greiner et al. (U.S. Pat. No. 4,547,429), and Tice et. al. (U.S. Pat. No. 5,407,609), among others and as taught by Herbig in the chapter entitled "Encapsulation" in Kirk Othmer, Encyclopedia of Chemical Technology, V. 13, Second Edition, pages 436-456 and by Huber et. al. in "Capsular Adhesives", TAPPI, Vol. 49, No. 5, pages 41A-44A, May 1966, all of which are incorporated herein by reference.

The first step in the encapsulation process is the preparation of the discrete particles, domains or beads of the carrier material or carrier precursor materials. Where such materials are in solution or liquid form and the encapsulation is to be by way of, e.g., coacervation, interfacial polymerization, etc., the solution or liquid containing the carrier or carrier precursor material is subjected to high shear mixing or agitation to create a suspension, emulsion or colloidal system of discrete domains of the carrier or carrier precursor of the requisite size. Where the carrier is a heat sensitive material, e.g., a wax or wax-like material, the carrier, with the therein incorporated curative, is heated above its melt temperature and then subjected to a similar high shear mixing or agitation in a liquid medium, preferably water, to create discrete droplets of the carrier and then cooled to allow the solid particles to form, before encapsulating. Where the curative is incorporated into a solid or substantially solid carrier, the carrier may be ground and sorted to the desired particle size before encapsulation. Such methods, as well as additional alternative methods for preparation of the particles or discrete domains for encapsulation are widely used in industry and well known to those skilled in the art.

One preferred microencapsulation technique is coacervation wherein the material to be encapsulated is dispersed or emulsified in a liquid solution of the material to be used as the wall material. The solution is perturbed to cause a phase separation of the wall material, or at least a portion thereof, from the solvent with all or some of the wall material coating the dispersed material to be encapsulated. In this process, the wall forming material may directly separate out onto the emulsified or dispersed core material or it may form its own emulsion with the droplets of the wall material subsequently depositing on the droplets of the core material. In either case, the liquid wall material deposits itself as a continuous coating about the dispersed droplets of the internal phase or capsule core material and the wall material is then solidified. Solution perturbation can be any that affects the solubility of the wall material including changes in temperature and addition of another solvent, including, for example, the addition of a non-solvent for the wall material. It should be readily understood by those skilled in the art that the foregoing may be accompanied by a pH shift with wall materials such as gelatin to promote the phase separation in the wall formation step, as taught in Green (U.S. Pat. Nos. 2,800,457 and 2,800,458, incorporated herein by reference).

In coacervation encapsulation, the material to be coated is typically a liquid and is emulsified in the solvent to form droplets which are then coated with the wall material. Oftentimes it is advantageous to also employ an emulsification agent to assist with the emulsification of the carrier materials or precursors thereof. Preferred emulsification agents that can be used are amphiphilic, that is, they contain both hydrophilic and hydrophobic groups in the same molecule. Exemplary emulsification agents include, but are not limited to, partially hydrolyzed polyvinyl alcohol, starch derivatives, cellulose derivatives, polyacrylamide, and the like. A preferred emulsification agent for use in the invention is partially hydrolyzed polyvinyl alcohol. In a preferred method, high shear agitation is provided to the aqueous mixture to achieve a droplet size of less than about 250 microns, preferably less than 100 microns.

The conditions for encapsulation will vary based upon the choice of the materials or compositions used for the capsule wall as well as the material to be encapsulated. Selection of the encapsulating materials or compositions depends upon a number of additional factors including the desired properties of the shell wall to be formed, the chemical composition and state of the material to be encapsulated and, in the case of a carrier material to be cured or polymerized in-situ concurrent with or subsequent to formation of the shell wall, the carrier precursor materials, including the curative and the method employed for the encapsulation process. Desired properties of the shell wall include strength, breakability, and impermeability, at least with respect to the curative in the case of the encapsulated cure system, particularly where the carrier is of a composition that allows for the migration or blooming of the curative in the carrier. Suitable materials for the capsule walls include natural materials such as gelatin, gum arabic, starches, sugars, shellac, and rosin, cellulose derivatives, such as ethyl cellulose and carboxymethylcellulose, paraffin, tristearin, polymers such as polyvinyl alcohol, polyethylene, polypropylene, polystyrene, polyacrylamides, polyethers, polyesters, polyamides, polybutadiene, polyisoprene, silicones, epoxies, polyurethanes, formaldehyde resins such as reaction products of formaldehyde with phenols, urea, and melamine, and copolymers such as polyurethane copolyethers. Melamine-formaldehyde and polyvinyl alcohol are preferred wall materials, especially the former.

Dyes, pigments, fillers, plasticizers, crosslinking agents, binding agents, and other additives can be incorporated in the capsule wall or applied to the capsule wall surface. One important parameter to keep in mind when formulating wall materials is permeability. Generally, the wall material should have low permeability, at least with respect to the material to be encapsulated. No or low permeability of the capsule wall is particularly important with respect to the curative in the carrier so as to prevent loss of the curative and premature polymerization of the curable composition. Likewise, it may be important for the capsule wall to be impermeable or of low permeability to the curable component of the curable composition so as to prevent any ingress of the same into the carrier particles. Dependent upon the encapsulated material, it may also be desirable to formulate the wall material to have low permeability to certain gases such as oxygen or low permeability to liquids such as water or solvents such as toluene or tetrahydrofuran. The requisite permeation rates will vary for each system, but can be met by judicious choice of the wall material and by degree of crosslinking of the wall material. Generally, as crosslinking increases, the permeation rate decreases.

As noted above, any of a number of different processes may be used to encapsulate the carrier materials as well as other components of the curable compositions. One preferred technique is to polymerize the capsule wall material in-situ. In this technique, monomers or oligomers are dispersed on the material to be encapsulated and then polymerization is effected by addition of a reactive species, such as a co-monomer or radical initiator, a curing agent or by heat or ultraviolet radiation. Optionally, the capsule wall material may be crosslinked in-situ by addition of crosslinking agents or by treatment with heat or ultraviolet radiation or radical initiators. The method of polymerizing or crosslinking the capsule wall material will vary based upon the choice of wall materials and based upon the material being encapsulated.

When the walls of the microcapsules are comprised of polyamide or polyurea, a preferred encapsulation technique is interfacial polymerization. This can be effected by mixing the adhesive monomer or monomers to be microencapsulated together with either an acid chloride or an isocyanate. The resultant mixture is emulsified with an emulsification agent to obtain an on-in-water emulsion. A polyfunctional amino compound is then added into the emulsion, whereby microcapsule walls are formed around each microparticle of oil. When an acid chloride is mixed with the polyfunctional amino compound, a polyamide microcapsule is produced—when an isocyanate is used, polyurea capsules are formed. Though reference is made to microparticles of the oil phase, it is also understood that the dispersed phase is also referred to herein as "domain", "bead" or "droplet" and the like.

Acid chlorides that can be used in the invention to produce polyamide microcapsules include, but are not limited to: terephthaloyl chloride, isophthaloyl chloride, 1,3,5-benzenetricarboxylic acid chloride, sebacyl dichloride, 4,4-sulfonyldibenzoyl chloride, 1,3-benzenedisulfonyl chloride, 1,4-benzenedisulfonyl chloride, or mixtures thereof. A preferred acid chloride for use in the invention is a mixture of isophthaloyl chloride and terephthaloyl chloride.

Isocyanate compounds that can be used in the invention to produce polyurea microcapsules include, but are not limited to: 2,4- and 2,6-diisocyanatotoluene, 4,4'-diisocyanatodiphenyl methane, 1,3,5-trimethylbenzene-2,4-diisocyanate, 1,6-diisocyanatohexane, polymethylene polyphenyl isocyanate, polyisocyanates which additionally contain biuret-, allophanate-, and carbodiimide groups, and the like.

Examples of polyfunctional amines that can be used in the invention include, but are not limited to: ethylene diamine, diethylene triamine, triethylene tetramine, tetraethylene pentamine 1,6 hexanediamine, polyethyleneimine, bis-hexamethylenetriamine, and the like.

Matson (U.S. Pat. No. 3,516,941) teaches polymerization reactions in which the material to be encapsulated, or core material, is dissolved in an organic, hydrophobic oil phase which is dispersed in an aqueous phase. The aqueous phase has dissolved aminoplast resin forming materials which upon polymerization form the wall of the microcapsule. A dispersion of fine oil droplets is prepared using high shear agitation. Addition of an acid catalyst initiates the polycondensation forming the aminoplast resin within the aqueous phase, resulting in the formation of an aminoplast polymer which is insoluble in both phases. As the polymerization advances, the aminoplast polymer separates from the aqueous phase and deposits on the surface of the dispersed droplets of the oil phase to form a capsule wall at the interface of the two phases, thus encapsulating the core material. Polymerizations that involve amines and aldehydes are known as aminoplast encapsulations. Urea-formaldehyde, urea-resorcinol-formaldehyde, urea-melamine-formaldehyde, and melamine-formaldehyde, capsule formations proceed in a like manner. In interfacial polymerization, the materials to form the capsule wall are in separate phases, one in an aqueous phase and the other in an oil phase. Polymerization occurs at the phase boundary. Thus, a polymeric capsule shell wall forms at the interface of the two phases thereby encapsulating the core material. Interfacial polymerization is particularly useful for wall materials such as polyesters, polyamides, and polyureas.

Gelatin and gelatin containing microcapsule wall materials are well known and are typically used in coacervation and phase separation encapsulation processes. One preferred technique for gelatin/gum arabic encapsulation involves first emulsifying the core material into a gelatin solution to obtain an oil-in-water emulsion. The emulsion is mixed with a gum arabic solution. The system is then pH adjusted or diluted to cause the gelatin/gum arabic to coacervate. Thereafter, the capsules are post-treated with a crosslinking agent, such as formaldehyde, glutaraldehyde, or other similar known compounds.

Wall materials made of melamine-formaldehyde can be made by first emulsifying the core material into a carboxylmethyl cellulose solution or a poly(styrene-maleic anhydride) solution to obtain an oil-in-water emulsion. The emulsion is then mixed with a melamine-formaldehyde precondensate solution. The system is then pH adjusted, followed by heating to initiate polymerization of the precondensate to a high molecular weight compound. The presence of the carboxyl methyl cellulose or poly(styrene-maleic anhydride) solution helps the polymerized melamine-formaldehyde to deposit onto the core material surfaces, thereby encapsulating the core. An alternative method polymerizes the melamine and formaldehyde in the presence of a styrene sulfonic acid. Yet, another alternative and a preferred embodiment of the melamine-formaldehyde resin wall forming process employs polyacrylic acid and/or polyacrylic acid derivatives and the like as emulsifiers to assist in forming the oil in water emulsions. Such emulsifiers preferably have an HLB value of from about 8 to 18.

Optionally, the wall material can be formed by free-radical polymerization or free radical crosslinking. This is especially useful for wall materials such as polyvinyl chloride, polystyrene, acrylic esters (e.g. alkyl acrylate-acrylic acid copolymers), unsaturated polyesters and the like. The free radical reaction can be initiated by heat, ultraviolet radiation or by addition of initiators such as benzoyl peroxide, t-amyl peroxyneodecanoate, t-amyl peroxypivalate, t-amyl peroxy-2-ethyl-hexanoate, t-butyl peroxyisobutyrate, t-amyl perbenzoate, di-t-butyl peroxide, 2,2'-azobis(2- methylbutyronitrile), 2,2'-azobis(2,4-dimethylvaleronitrile), 2,2'-azobis(2-methylpropanenitrile), and the like.

When the walls of the microcapsules are comprised of epoxies, suitable components include difunctional or polyfunctional epoxides such as vinylcyclohexene dioxide, 3,4-epoxycyclohexylmethyl-3,4-epoxycyclohexanecarboxylate, bis-phenol-A-digylcidyl ether and the like. These can be used in combination with polyols such as glycerol. One convenient method of forming microcapsules involves forming an emulsion of the material to be encapsulated, adding a combination of the di- or polyfunctional epoxide with the polyol to coat the material to be encapsulated and then adding an acid to effect the polymerization and form the polyepoxide. Suitable acids include Bronsted acids such as hydrochloric acid or sulfuric acid and also Lewis acids such as boron trifluoride, antimony pentafluoride and the like.

The encapsulated cure systems of the present invention provide a number of benefits and advantages to encapsulated adhesive and sealant systems which are neither found nor possible with the current conventional encapsulated systems. In particular, as noted previously, the carrier may comprise a material that has inherent or latent adhesive properties or characteristics that, in use, provides a dual mode of bonding or sealing. Even if the carrier does not, by itself, provide any particular action, it oftentimes will act as a structural filler providing added strength or durability to the adhesive or sealant material itself: thus, enhancing the cohesive strength of the adhesive or sealant. This is particularly true where the carrier and the curable composition, either by their inherent nature or as a result of the process by which the curable compositions are initiated and/or the curative is made available to the polymerizable component of the adhesive or sealant, form an interpenetrating network or otherwise become interspersed or are miscible with each other. In essence, the curable composition may end up filling voids, channels or pockets in and through the carrier.

While the foregoing are certainly beneficial and desirable attributes, a more important function of the carrier is to serve as a protective reservoir for the curative and as a spatial protector for other encapsulated components of the curable composition in or with which they are used. First, because the curative is incorporated into the carrier, and is preferably not mobile within the carrier, the curative, or at least a sufficient amount of the curative, is not generally available to the polymerizable component, even in the absence of the encapsulating shell. Instead, conditions must be imposed that convert the carrier to a flowable state and/or, in accordance with the preferred embodiment, the carrier must be mechanically worked through a repetitive mashing or kneading type action to expose more and more of the entrapped curative to the carrier surface and the liquid curable component. Thus, as discussed below, and except as noted below, conventional finger pressure, pinch roll activation and the like found with traditional encapsulated adhesive and sealant systems will not be sufficient generally to expose enough of the curative to provide adequate cure or polymerization. While this then requires more action and, perhaps, more costly or sophisticated equipment for initiating the cure, it means that such adhesives and sealants can now be used in high stress environments and processes and/or applications where significant forces are acted upon the encapsulated adhesive prior to the desired or intended point or time of initiation or activation. It also means that there is less concern or sensitivity for the method or process by which these microcapsules are formulated into an adhesive or sealant composition and or the process by which they or the so formulated adhesive and sealant compositions are dispensed or applied. Consequently, the present invention enables and facilitates the use of these types of encapsulated, especially pre-applied encapsulated, adhesive and sealant compositions in high speed industrial applications, especially those applications where the adhesive or the pre-applied adhesive, as appropriate, is subject to intentional or unintentional forces that are capable of pre-maturely rupturing the microcapsule walls.

In addition to protecting or preventing the release of the curative in the event of premature rupture of the shell wall of the curative microcapsule, the curing systems of the present invention also act as spacers and protectors of other encapsulated components of curable systems where one or more of the liquid components thereof are also encapsulated or pre-applied and overlaid with an encapsulating film. Indeed, the carrier provides structural integrity to the microcapsule so that, in use, the microcapsule acts much like the microspheres of the prior art, preventing the premature collapse or fracture of the microcapsules containing the curable composition or other liquid components. This attribute is especially beneficial where the curable composition, or at least the encapsulated cure system according to the present invention, is pre-applied to a substrate which is subsequently stacked or in storage or handling comes in contact with other substrates, thereby applying pressure to the microcapsules containing the carrier and curative. The structural integrity or resistance to deformation of the carrier material, in addition to the structural integrity of the capsule wall covering the carrier material, protects the microcapsules containing the liquid polymerizable or curable components of the curable composition; provided, of course that the latter are of about the same or smaller particle size. Slightly larger particle sizes for the encapsulated curable composition are allowed so long as there is sufficient flexibility in their capsule walls to accept the initial pressure without rupturing before the encapsulated cure system particles thereafter assume the primary burden of the pressure or forces acting upon the preapplied adhesive. Even if there were some rupturing of the capsules containing the liquid polymerizable or curable components of the curable composition and/or the carrier, because the curative is entrained within the carrier, as mentioned above, there is insufficient curative available to initiate any significant cure or polymerization.

The benefit of this spatial protection is not just limited to the pre-applied adhesives but also pertains to the formulated adhesive as well as the encapsulated cure systems themselves, especially with respect to their storage and handling stability. Because of the structural integrity of the microcapsules resulting from the shell wall and, more importantly, the carrier material, the microcapsules are less prone to premature fracture or rupture. Furthermore, as noted above, the cells was may have little structural integrity or strength themselves; rather; depending upon the carrier material, the structural integrity of the encapsulated cure system microcapsules may well be attributed to the encapsulated carrier itself. In such circumstance, there is little concern relative to the premature fracturing or rupturing of the cell wall since the curative within the carrier is still not available. Thus, less concern is needed for the packaging, handling and volume of containers of the encapsulated cure system as well as curable compositions into which they have been incorporated. In the former, the encapsulated cure systems will support one another. In the latter, the encapsulated cure system wall support and bear the bad of the other capsules in the formulated composition, thus relieving the forces that would otherwise be acting upon the liquid capsules. Furthermore, even if premature fracture or rupture occurs, the curative contained within the carrier is not lost and such carrier particles may be merely re-encapsulated, if necessary.

Yet another key benefit of the encapsulated cure systems of the present invention is that when they are intimately mixed with liquid polymerizable components of the curable composition, besides making the curative available, the carrier itself is intimately mixed with the liquid curable components and provides a thickening and/or thixotropic effect on the liquid curable components. This thickening effect lessens the ease of or potential for squeeze out during the mating process of two substrates between which the curable composition is to be applied. More importantly, it allows for the use of liquid curable compositions on porous substrates as well as substrates having rough or uneven surfaces or where gaps are present when the two substrates to be bonded are mated. Specifically, this thickening effect on the liquid curable components ensures or helps to ensure that the activated curable composition is more likely to stay where it is applied. Also, it allows the curable composition to be applied as a bead or raised ridge of material, again to ensure filling and/or bridging of any gap that may exist. Although conventional liquid adhesives may be applied as a bead, their low viscosity does not allow the height of the bead to remain. Instead, the liquid bead will have a tendency to spread out forming more of a flat tape-like bead of the liquid. While the beads of the present invention may not remain of their original height, the tendency to flow will be less allowing more time to mate the substrates to be bonded. In essence, like a scoop of ice cream, even the thickened adhesive bead will have a tendency to slowly shorten and spread out.

In the present invention, the high viscosity or thickened bead may be formed after the intimate mixing of the components or concurrent therewith. For example, as mentioned later, the activator mechanism or apparatus used to mix the components may be or include a series of dams or barriers that pushes and kneads the curable composition back and forth as the substrate upon which it is applied is passed through or past the activator mechanism or apparatus. This apparatus acts like a snow plow leaving a bead or "bank" of the intimately mixed curable composition on the substrate as it emerges from the last dam or barrier. Alternatively, if a handheld or automated dispenser is employed that incorporates a mixing means in the dispenser, the dispenser may be such that it includes an orifice from which a continuous or discontinuous bead of the intimately mixed curable composition is dispensed. In essence, because of the thickening or gelling effect of the carrier particle, the activated curable composition maybe applied to a substrate in any number of profiles and is capable of maintaining, or substantially maintaining that profile for a prolonged period.

As noted above, the encapsulated cure systems of the present invention may be employed with a number of curable compositions: the selection of the curative in the encapsulated cure system being appropriate for the cure or polymerization mechanism to be used for effecting cure, polymerization and/or cross-linking of the polymerizable or curable component of the curable composition. In this respect, it is to be understood that the curative(s) in any one microencapsulated carrier may not represent the full complement of curatives or curing agents needed to complete the curing or polymerization or cross-linking of any given curable composition. Thus, Applicants' reference to the microencapsulated cure systems is to be understood as encompassing encapsulated carrier particles which incorporate the full complement of curatives needed as well as one or more, but not all, curatives needed for effectuating the cure, polymerization and/or cross-linking of the curable components of the curable compositions. Furthermore, it may be particularly important, if not critical, in such circumstances that one or more curatives or curing agents be isolated from one or more other required curatives or curing agents.

Consequently, it is contemplated that curable compositions made in accordance with the practice of the present invention may have dispersed or dissolved therein one or more of the required curatives provided that the same is not co-reactive therewith in the absence of the encapsulated curative contained in the carrier. Alternatively, or in addition thereto, particularly where one or more of the curable components of the curable composition is also encapsulated, it is contemplated that one or more of the curatives may be dispersed or dissolved therein and encapsulated therewith, again provided that the same is not co-reactive with the encapsulated curable components in the absence of the encapsulated curative contained in the carrier. Yet another alternative approach incorporates a plurality of microencapsulated cure systems made in accordance with the reaching of the present invention, each containing a different curative in a carrier. A preferred requirement of these possible embodiments is that all of the curatives needed to effectuate the cure, polymerization and/or cross-linking of the curable composition are present in the formulated curable composition such that when all of the curatives are made available to each other and to the curable components of the curable composition and, if appropriate, the proper environmental conditions are met, e.g., elevated temperature or absence of oxygen, then curing, polymerization and/or cross-linking will occur. However, it is also understood that certain curatives critical for effecting polymerization, cure or cross-linking may inherently be present on the substrate surface to which the composition of the present invention is to be applied e.g., metal salts or oxides, in the case of metal substrates, or such curatives may be pre-applied to the substrate as a primer material, e.g., a solution of a curative in a solvent carrier may be used to prime or apply the curative to the substrate.

Generally speaking, the encapsulated cure systems of the present invention may be employed with essentially any curable or polymerizable chemistry, particularly any adhesive or sealant chemistry, regardless of whether the same is a one-, two- or more part system; a liquid system or dry-to the touch pre-applied system, especially those wherein the liquid curable or polymerizable matrix monomers, prepolymers and/or polymers are encapsulated as well; and the like For any given application, the more critical factor is whether such application is amenable to or can it be adapted to allow for the processing or working of the adhesive composition needed for ensure adequate rupturing the shell of the encapsulated cure system and making available of the entrained curative in the carrier. While peeling away the shell will expose some of the curative that is present on the outer surface of the carrier, the amount of curative thus available is not, or is not likely to be, sufficient to effectuate adequate, if, indeed, any significant level of, cure, polymerization and/or cross-linking of the curable composition with which it is employed. Instead, the carrier must typically be subjected to mixing, kneading or some other condition that maximizes the release or exposure of the therein-contained curative to the remainder of the curable composition or at least to those constituents thereof that are needed for effecting cure or polymerization.

As mentioned, the encapsulated cure systems of the present invention are suitable for use in a broad variety of one-part liquid curable systems. With conventional encapsulated systems, concerns arise relative to premature fracture and/or polymerization of the curable composition due to high shear forces during the preparation and/or dispensing of the liquid curable composition. However, with the encapsulated cure systems of the present invention, the novel carrier systems alleviate concerns relative to premature fracture and/or polymerization. Indeed, high shear forces during the preparation of the adhesive formulation and/or the dispensing of the same are typically insufficient to make available sufficient curative to initiate premature polymerization or cure. On the other hand, for these new adhesive systems to be truly efficacious, it is desirable, and may be necessary, that the application and/or assembly process in which the liquid curable system is employed provide for an appropriate opportunity or means for rendering the curative in the carrier available for effecting or initiating polymerization of the curable compositions. For example, the curable compositions of the present invention are suitable for use in bonding or sealing threaded elements where such threaded elements are subject to multiple turns during the assembly process. Threaded assemblies employing few or less than a whole turn as well as press/snap fit assemblies may realize some bonding provided a large shear is present; however, such assemblies or applications are not encouraged. Similar limitations may be found where the capsule wall is ruptured and the curative made available, by pinch rolling or the application of finger pressure. In essence, such minimal action on the carrier is oftentimes insufficient to release or make available a suitable amount of curative necessary for effecting full or even substantial cure or polymerization of the curable composition. Among the exceptions to this limitation, however, would be those encapsulated curative systems where the carrier is a wax and the liquid curable composition containing the encapsulated cure system is exposed to sufficient heat to melt the wax prior to or concurrent with the application of pressure and/or mating of the two substrates to be joined or where the carrier is a thixotropic material.

The more typical and, perhaps, practical use of the encapsulated cure systems of the present invention is in or in association with pre-applied adhesives, including any of the general types mentioned above. It is in these compositions that the benefits of the more difficult accessibility of or to the curative and the protective nature or spacer benefit of the encapsulated cure systems of the present invention come through. As above, however, it is critical that the application or assembly process in which the encapsulated cure system is employed provides for the appropriate means for rendering the curative in the carrier available for effecting or initiating polymerization of the curable compositions.

Unlike the liquid curable compositions mentioned above which are applied and cured at the time of intended use, pre-applied adhesives and sealants are applied in the manufacturing or conversion process of the substrate to which they are applied but not cured until later, oftentimes much later, depending upon the storage and shelf stability of the curable composition and demand for the stock material or substrate to which it is applied. Typically, the stock material or substrates to which such adhesives or sealants are applied are stacked on top of one another or placed in containers where they come in contact with one another and/or are subjected to use or assembly operations where there is the opportunity for many different forces and other substrates to come in contact with the pre-applied material. Should the capsule or shell wall of the encapsulated cure system fail or rupture as a result of such forces or activities, there is insufficient shearing and mixing of the carrier to make available adequate curative for effecting premature polymerization, cure or cross-linking of the curable composition. Furthermore, in those pre-applied adhesive systems comprising the encapsulated cure system dispersed in a liquid polymerizable component, all of which is sandwiched between the underlying substrate to which it is applied and an overlaying cured polymer film or layer, when the depth of the layer of the liquid adhesive is less than the particle size of the encapsulated cure system the encapsulated cure system acts as a spacer to prevent the collapse and/or fracture of the polymer film. Similarly, in the more common pre-applied encapsulated adhesive systems wherein the liquid curable component is also encapsulated, when the average particle size of the encapsulated liquid components is less than, the same as or slightly larger than the average particle size of the encapsulated cure system, the encapsulated cure system again acts as a spacer to prevent the collapse and/or fracture of microcapsules containing the liquid curable component. This latter aspect is especially beneficial since it allows for the use of capsules or shells that thinner than are traditionally used in encapsulating the liquid curable component. This in turn provides for a greater volume of liquid curable component than traditionally found with the same volume of traditional encapsulated adhesive and sealant compositions and, further, better bonding and/or sealing performance since more liquid is available at the interface where the bond or seal is to be formed.

Another benefit of the encapsulated cure systems of the present invention is that they allow the user to tailor the curative to a specific end use as well as regulate the cure speed even with the same cure system. For example, where the carrier is wholly or partially soluble in, miscible with or swellable by the liquid component of the curable composition, the degree of solubility or swellability will affect access to the curative in the carrier. Similarly, the ease with which the carrier is smeared or kneaded will also dictate the speed with the curative is made available to the curable liquid. With a given encapsulated cure system, the speed and duration for which the adhesive or sealant system containing the curative is mixed will also affect the degree and speed with which the curative and curable liquid is brought into intimate contact. For a given level of curative in the carrier, a faster and/or longer mixing will enhance the exposure of curative to the curable liquid: thus speeding cure and/or facilitating a fuller cure or degree of polymerization. Slower or less mixing will result in less interaction and slower and/or less overall cure.

As noted previously, the encapsulated cure systems of the present invention are useful for initiating and/or effectuating, directly or indirectly, the cure or polymerization of adhesive and sealant compositions generally. Such cure or polymerization may be by way of addition polymerization, step growth polymerization or both. Addition polymerization includes free radical polymerization, cationic polymerization and anionic polymerization. Especially preferred free radically polymerizable systems are those characterized as anaerobic adhesives and sealants, i.e., those that polymerize or cure in the absence of air.

Generally speaking, suitable curable compositions include any of those heretofore known or hereafter found to be suitable or adaptable for the preparation of one-part (i.e., single package) encapsulated adhesive and sealant compositions. Such compositions are characterized as being storage stable, curable compositions having one or more components isolated, through encapsulation, from other components, which curable compositions, in the absence of such encapsulation, would polymerize or cure. Such curable compositions comprise the curative, which, according to the present invention, is contained in the carrier, and the liquid or viscous component or components of the adhesive or sealant compositions. In the practice of the present invention, the latter will not substantially change their physical state or phase, but rather remain in a liquid or viscous state, unless and until intermixed with the curative, and, if applicable, exposed to the appropriate conditions for effecting polymerization.

The liquid or viscous component of the curable composition may itself be encapsulated as with single package, dry adhesive and sealant systems which typically comprise a dry blend of microencapsulated components or with liquid adhesive or sealant systems wherein the encapsulated components are dispersed in a liquid binder system or pre-applied to a substrate by a cured or hardened binder system. Alternatively, the curable composition may be a single package, wet adhesive or sealant system where the encapsulated carrier is dispersed in the liquid or viscous curable material. Though reference has most often been made to liquid curable components or the liquid adhesive or sealant compositions, it is understood that such reference also includes flowable and/or non-flowing viscous materials and compositions as well. Similarly, while no substantive changes occur in the physical state or phase of the liquid curable component until the liquid or viscous component is exposed to the curative, as noted below, such liquid or viscous compositions may further include or themselves comprise compounds which increase in viscosity so long as the curable composition remains in a liquid or viscous state or phase. Generally, the liquid or viscous polymerizable or curable components are in the form of low molecular weight monomers, oligomers and/or prepolymers.

Among the various classes of curable compositions suitable for use within the practice of the present invention are, for example, those that undergo vinyl polymerization, i.e., those having at least one vinyl group $CH_2=CH-$ and/or reactive unsaturation (i.e., $-C=C-$); unsaturated polyesters; urethanes; epoxy resins; polysulfides; isocyanates; silicones; polyethers, polyurethanes and polyolefins having silanol moieties capable of undergoing silanol condensation or hydrosilation reactions; and phenoxy resins. The present invention is also applicable to combinations of curable compositions within the same or different classes, regardless of whether they cure by the same or a different mechanism. With the latter, the curative for each curable composition may be in the same or a different encapsulated carrier component. Alternatively, especially where the cure mechanism for one of the curable compositions is a longer term, secondary type cure mechanism, the curative for that curable composition may be encapsulated with the curable component for the other curable composition. Additionally, the curable compositions of the present invention may be capable of bi-modal cure or polymerization, i.e., they are able to cure or polymerize through two different cure mechanisms. The latter may be especially found with curable compositions that form linear polymer chains by one mechanism and cross-link by another. Furthermore, such compositions may include a copolymerizable component and/or a secondary polymerizable component which co-polymerizes or co-reacts with the primary component or with secondary reactive sites on the primary polymer, respectively.

The curable compositions are based on low molecular weight, reactive monomers, oligomers and/or pre-polymers which can be cured or polymerized. Pre-polymer formulations typically include additional co-polymerizable monomers and/or oligomers and are essentially a pre-adhesive and/or pre-sealant. While the present invention is certainly, and in certain applications preferably, applicable to step growth polymerizable compositions, the requirement for proper stoichiometry of the primary polymerizable component and the hardener or co-reactive component makes these curable compositions more difficult to use. Furthermore, depending upon the molecular size of the hardener or co-reactive component, such compositions may require a much larger weight percent of the carrier particles than addition polymerizable compositions where the curatives tend to be low or lower molecular weight materials. Thus, the present invention is especially applicable to addition polymerizable compositions.

Preferred addition polymerizable curable compositions are those that undergo vinyl addition, including those based on styrene and substituted styrenes such as alpha-methyl styrene; acrylamides; nitriles such as cyanoacrylates and methacrylonitriles; vinyl ketones such as ethyl vinyl ketone; vinyl esters such as vinyl acetate and vinyl proprionate; olefins such as ethylene, propylene and isobutylene; halogenated olefins such as vinyl chloride and vinylidene chloride; and diene monomers such as butadiene, isoprene and chloroprene as well as copolymers of the foregoing such as vinyl chloride-vinyl acetate copolymer. Oftentimes it is desirable that such components be used in their oligomeric form, wherein the oligomer has residual unsaturation or another reactive moiety or functional group, for example, hydroxyl, amino, carboxylic, epoxy and the like groups, which enables further polymerization or cross-linking.

For instance, an amine functionalized polystyrene oligomer may be employed whereby initial cure or polymerization occurs at the point of unsaturation concurrent with or followed by cross-linking at the amine functionality with, for example, an isocyanate.

Especially preferred additional polymerizable components are the poly- and mono-functional acrylate and methacrylate esters, i.e., monomers, oligomers and prepolymers having one or more acryloyl (i.e., $CH_2=C(R)COO-$) and/or methacryloyl (i.e., $CH_2=C(CH_3)COO-$) terminal or pendent moieties. For convenience, as used herein and in the appended claims, reference to the term "(meth)acrylate" is to be understood as referring to both the acrylate and the methacrylate versions of the specified monomer, oligomer and/or prepolymer, (for example "allyl(meth)acrylate" indicates that both allyl methacrylate and allyl acrylate are possible). Such materials encompass a broad spectrum of polymerizable components including, for example, polyester poly(meth)acrylates, urethane and polyurethane poly(meth)acrylates (especially those prepared by the reaction of an hydroxyalkyl(meth)acrylate with a polyisocyanate or a urethane polyisocyanate), methylcyanoacrylate, ethylcyanoacrylate, diethyleneglycol di(meth)acrylate, trimethylolpropane tri(meth)acrylate, ethylene glycol di(meth)acrylate, allyl(meth)acrylate, glycidyl (meth)acrylate, (meth)acrylate functional silicones, di-, tri- and tetraethylene glycol di(meth)acrylate, dipropylene glycol di(meth)acrylate, polyethylene glycol di(meth)acrylate, di(pentamethylene glycol)di(meth)acrylate, ethylene di(meth)acrylate, neopentyl glycol di(meth)acrylate, trimethylol propane tri(meth)acrylate, ethoxylated bisphenol A di(meth)acrylates, bisphenol A di(meth)acrylates, diglycerol di(meth)acrylate, tetraethylene glycol dichloroacrylate, 1,3-butanediol di(meth)acrylate, neopentyl di(meth)acrylate, trimethylolpropane tri(meth)acrylate, polyethylene glycol di(meth)acrylate and dipropylene glycol di(meth)acrylate. While di- and polyacrylates and methacrylates, especially the dimethacrylates, are the generally preferred materials. Monofunctional acrylates, i.e., those containing only one acrylate group, may also be advantageously used. Typical monoacrylates include 2-ethylhexyl(meth)acrylate, 2-hydroxyethyl (meth)acrylate, cyanoethyl(meth)acrylate, 2-hydroxypropyl (meth)acrylate, p-dimethylaminoethyl(meth)acrylate, lauryl (meth)acrylate, cyclohexyl(meth)acrylate, tetrahydrofurfuryl(meth)acrylate, chlorobenzyl(meth)acrylate, and glycidyl(meth)acrylate. Of course mixtures of (meth)acrylates or their derivatives as well as combinations of one or more (meth)acrylate monomers, oligomers and/or pre-polymers or their derivatives with other copolymerizable monomers, including acrylonitriles and methacrylonitriles may be used as well.

(Meth)acrylates are typically polymerized by a free radical reaction. Initiators of free radical polymerization useful in the practice of the present invention include, but are not limited to peroxides, hydroperoxides, peresters, peracids, peroxycarbonates, peroxyketones, azo compounds and redox initiators, and derivatives of the foregoing. Exemplary initiators include benzoyl peroxide, cumene hydroperoxide, t-butyl hydroperoxide, dicumyl peroxide, decanoyl peroxide, lauroyl peroxide, di-(n-propyl)peroxide, t-butyl peroxide acetate, t-butyl perbenzoate, t-butylperoxybenzoate, t-butylperoxyacetate, di-t-butyl azodiisobutyronitrile, t-amyl peroxyneodecanoate, dichlorobenzoyl peroxide, methylethylketone hydroperoxide, t-butyl peroxide, t-amyl peroxypivalate, t-amyl peroxy-2-ethyl-hexanoate, t-butyl peroxyisobutyrate, di-sec-butyl peroxydicarbonate, di-(2-ethylhexyl)peroxydicarbonate, 1,1-dimethyl-3-hydroxybutyl peroxyneodecanoate, $\alpha$-cumyl peroxyneoheptanoate, t-amyl peroxyneodecanoate, t-amyl peroxypivalate, t-butyl peroxypivalate, t-amyl peroxy-2-ethylhexanoate, t-amyl peroxyacetate, t-amyl perbenzoate, di-t-butyl peroxide, 2,2'-azobis(2-methylbutyronitrile), 2,2'-azobis(isobutyronitrile), 2,2'-azobis(2,4-dimethylpentanenitrile), 2,2'-azobis(2,4-dimethylvaleronitrile), 2,2'-azobis(2-methylpropanenitrile), 1,1'-azobis(cyclohexanecarbonitrile), 1,1'-azobis(cyanocyclohexane) and the like. Especially preferred initiators are the peroxides, hydroperoxides, peresters and peracids, most preferably benzoyl peroxide. Typically such initiators are present at a level of from about 0.01% to about 10%, preferably from about 0.5% to about 3.0%, most preferably from about 0.1% to about 2%, by weight based on the weight of the component(s) curable by the free radical polymerization.

In addition to the initiator, such free radical polymerizable compositions further include an accelerator of free radical polymerization. Commonly known accelerators include amines and sulfimides. Tertiary amines, such as N,N-dimethylparatoluidine, triethylenetetramine, diethylenetriamine, N,N-dimethylaniline, N,N-diethylparatoluidine, and N,N-diethylaniline, and sulfimides such as 3-oxo-2,3-dihydrobenz-[d]isothiazole-1,1-dioxide (saccharin) are particularly useful. Useful accelerators also include the aldehyde-amine reaction products such as butyraldehyde-aniline and butyraldehyde-butylamine. The most preferred accelerators, however, are the organometallic compounds known as metallocenes, especially the ferrocenes, and the organometallic polymers containing at least one metallocene, preferably ferrocene, moiety. Exemplary organometallic accelerators include ferrocene, butyl ferrocene, titanocene and cupricene. Accelerators are typically used at levels of from about 0.01% to about 1.0% by weight based on the weight of the component(s) curable by free radical polymerization. Notwithstanding the foregoing, those skilled in the art will recognize that the use of tertiary amines is or may be preferred over the metallocenes in certain systems and/or applications, especially those wherein there may be concern for migration of the metallocene into the curable binder system, especially UV curable binder systems, as mentioned below.

A preferred class of (meth)acrylate based curable compositions suitable for use in the practice of the present invention are those know as anaerobic adhesive and sealant compositions. These compositions typically comprise a free radically polymerizable monomer, oligomer and/or pre-polymer, a free radical initiator and a free radical accelerator, with or without a stabilizer or inhibitor such as polyhydric phenols, quinones, and the like. Especially preferred polymerizable monomers, oligomers and prepolymers include 2-hydroxyethyl(meth) acrylate, 2-hydroxypropyl(meth)acrylate, mono-, di-, tri- and tetra-ethylene glycol di(meth)acrylate, trimethylol propane tri(meth)acrylate, ethoxylated bisphenol A di(meth)acrylates, polyester (meth)acrylates and their derivatives, polyethylene glycol (meth)acrylates and their derivatives and polyurethane (meth)acrylates and their derivatives. Suitable quinones include hydroquinones, benzoquinones, naphthaquinones, phenanthraquinones, anthraquinones and substituted compounds of the foregoing. These inhibitors preferably are present in the adhesive composition in only very small amounts, usually from about 10 to 1000 parts per million (ppm), and more preferably from about 50 to 500 ppm. The anaerobic compositions may also include chelators such as beta-diketones, ethylenediamine tetraacetic acid and the sodium salt thereof. Anaerobic compositions are especially suited for applications where concern exists for premature curing or polymerization of the curable components prior to mating of the substrates to be bonded or cured.

The present invention is also applicable to a broad array of epoxy resins including, but certainly not limited to, those of the types disclosed in Deckert et. al. (U.S. Pat. No. 3,746, 068); Hart et. al. (U.S. Pat. No. 4,536,524); Earls et. al. (U.S. Pat. No. 5,510,431); and Siebert et. al. (U.S. Pat. No. 5,157, 077 and U.S. Pat. No. 5,140,068), all incorporated herein by reference. Generally speaking, suitable epoxy resins typically comprise a mixture of low molecular weight oligomers containing, on average, two or more epoxide groups per molecule: though they may also comprise oligomeric prepolymers of the foregoing. The most common epoxy resins are those based upon glycidyl compounds, especially the glycidyl ethers such as those based on bisphenol A or on resorcinol and, to a lesser extent, the diglycidyl esters, especially the diglycidyl esters of phthalic acid, hexahydrophthalic acid and tetrahydrophthalic acid. Other suitable epoxy resins include the novolak-epoxy resins, particularly those based on the phenol novolaks or cresol novolaks, the glycidyl ethers of glycerol, polypropylene glycol or pentaerythritol, as well as the glycidyl esters, glycidyl amines, epoxidized diene polymers and the cycloaliphatic epoxy resins.

The epoxy resins may be polymerized by treatment with hardeners or curing agents that react with the epoxide group. Suitable curing agents include aliphatic primary and secondary amines such as diethylenetriamine, triethylenetetramine, and diethylaminopropylene, aromatic amines such as m-phenylenediamine, 4,4'-diaminodiphenylmethane and diaminodiphenylsuphone; anhydrides, especially acid anhydrides, such as phthalic, tetrahydrophthalic, hexahydrophthalic, maleic, pyromellitic, trimellitic, nadic methyl, dodecenylsuccinic and chlorendic anhydrides; and fatty polyamides. Other suitable curing agents include dicyandiamide, melamine, and imidazole derivatives; modified amines such as ethylene oxide- and acrylonitrile-epoxy resin adducts and ketimines, Lewis acids such as boron trifluoride-monoethylamine complex and Lewis bases such as o-(diethylaminoethyl)phenol, tris-(dimethylaminomethyl)phenol and 2-ethyl-4-methyl imidazole. For chemically curing or polymerizing the epoxy compounds and resins, a number of cationic initiators may be used including HCl, HBr, HI, $C_6H_5SO_3H$, $HSbF_6$, $HAsF_6$, $HBF_4$ or Lewis acids such as metal halide salts. The amount of curing agent added depends upon the specific curing agent employed, but is typically 0.85 to 1.0 moles per epoxy stoichiometry, especially in the case of anhydrides or in stoichiometric amounts in the case of amines, or from about 0.01% to about 10%, preferably from about 0.1% to about 3% by weight, based on the weight of the curable epoxy, in the case of cationic initiators for chemical curing. With the anhydrides, about 1% of a tertiary amine is also employed as a catalyst. Those skilled in the art will readily appreciate the proper selection and quantity of hardeners and catalysts to employ.

Oftentimes, and preferably depending upon the application, an epoxy prepolymer is reacted with a polyol and most preferably a polyester or polyether polyol. Polyether polyols include linear and/or branched polyethers having a plurality of ether bonds and at least two hydroxyl groups. Examples of the polyether polyol include polyoxyalkylene polyol such as polyethylene ether glycol, polypropylene ether glycol, polybutylene ether glycol and the like. Suitable polyols include homopolymers and copolymers thereof, especially copolymers of the polyoxyalkylene polyols. Particularly preferable copolymers of the polyoxyalkylene polyols may include an adduct with at least one compound selected from the group consisting of ethylene glycol, propylene glycol, diethylene glycol, dipropylene glycol, triethylene glycol, 2-ethylhexanediol-1,3,glycerin, 1,2,6-hexane triol, trimethylol propane, trimethylol ethane, tris(hydroxyphenyl)propane, triethanolamine, triisopropanolamine, ethylenediamine, and ethanolamine, with at least one compound selected from the group consisting of ethylene oxide, propylene oxide and butylene oxide.

Polyester polyols are formed from the condensation of one or more polyhydric alcohols having from 2 to 15 carbon atoms with one or more polycarboxylic adds having from 2 to 14 carbon atoms. Examples of suitable polyhydric alcohols include ethylene glycol, propylene glycol such as 1,2-propylene glycol and 1,3-propylene glycol, glycerol, pentaerythritol, trimethylolpropane, 1,4,6-octanetriol, butanediol, pentanediol, hexanediol, dodecanediol, octanediol, glycerol monoallyl ether, glycerol monoethyl ether, diethylene glycol, 1,3-bis-(2-hydroxyethoxy)-propane and the like. Examples of polycarboxylic adds include phthalic acid, isophthalic acid, terephthalic acid, maleic acid, octadecenylmaleic acid, fumaric acid, trimellitic acid, adipic acid, malonic acid, glutaric acid, and the corresponding acid anhydrides, acid chlorides and acid esters such as phthalic anhydride, phthaloyl chloride, and the dimethyl ester of phthalic acid. Preferred polycarboxylic adds are the aliphatic and cycloaliphatic dicarboxylic adds containing no more than 14 carbon atoms and the aromatic dicarboxylic adds containing no more than 14 atoms.

The curable compositions may also be based on unsaturated polyesters, many of which are derived from the same monomers as the aforementioned polyester polyols. Such unsaturated polyesters oftentimes exist as combinations thereof with an unsaturated monomer as a diluent, such as styrene. The unsaturated polyester resins are usually the product of a reaction between one or more unsaturated dibasic adds and one or more dihydric alcohols, including those noted in the prior paragraph. Curing or polymerizing the unsaturated polyesters typically requires an initiator and an accelerator; however, once free-radical polymerization is initiated, such polymerization is self-sustaining. Suitable accelerators include materials such as diethylaniline, dimethylaniline and N,N-dimethyl toluidine. Suitable initiators include such materials as benzoyl peroxide, ethylmethyl ketone peroxide, cumene hydroperoxide and dichlorobenzoyl peroxide. Of course other accelerators and initiators for the unsaturated polyesters may be used as well and are well known to those skilled in the art.

Another class of curable polymeric resins to which the present invention is applicable is the class of polyurethane prepolymer resins. Such polyurethane prepolymer resins include free isocyanate moieties or groups as the reactive and polymerizing moiety of the molecule and are typically the reaction product of poly(alkylene)glycols and polyisocyanates. Specific polyurethane prepolymers include, for example, the reaction product of poly(1,4-butylene oxide) glycol and tolylene diisocyanate and/or methylene diisocyanate. Such resins may have as much as 5 percent, by weight, of free isocyanate groups available for reaction. Curing agents suitable for use with the polyurethane prepolymer resins include methylene-bis-(o-chloroaniline), polyols (such as 1,4-butanediol), or trimethylolpropane, or even water. Other suitable polyurethane resins include those that have free hydroxyl or olefinic functionality and cure through free radical polymerization. Suitable catalysts for the polyurethanes include, among others, tin carboxylates, organosilicone titinates, alkyl titinates, bis carboxylates, tertiary amines, amidines, tin mercaptides, and naphthenates or alkanoate salts of lead, cobalt, manganese, bismuth or iron. Specific catalysts include tin(II)diacetate, tin(II)dioctanoate, tin(II)dilaurate, dibutyltin diacetate, dibutyltin dilaurate, dibutyltin maleate, stannous octoate, stannous oleate, stannous acetate, stannous laureate, 2,3-dimethyl-3,4,5,6-tetrahydropyrimidine, triethylamine, tributylamine, dimethylbenzylamine, N,N,N',N' tetramethethylenediamine, 1,2-dimethylimidazole, triethylenediamine, tetrabutyl titanate, tetrapropyl titanate, etc.

The adhesive may also be based upon liquid polysulfide prepolymers comprising an oligomeric polysulfide terminated with thiol groups. Such polysulfides typically have the chemical structure: $HS(R-S_x)_nH$ where x is either 1 or a small number of 2-4; x is an integer of 1 to 25 and R is an alkylene, arylene or alkoxyalkylene, including, in particular, $-CH_2CH_2-$ and/or $-CH_2(OCH_2CH_2)_2-$ often times further included the branching group $-CH_2CHCH_2-$. Preferred oligomeric polysulfides are those based on the polyalkylene sulfides such as polyethylene sulphide and polypropylene sulfide as the polyarylene sulfides such as poly(2,4-tolylene sulfide), poly(4,4'-biphenylene sulfide), and poly(phenylene sulfide) (PPS). The thiol terminated oligomeric polysulfide may be polymerized or cured by reacting with epoxy or phenolic resins or compounds as well as with diisocyanates. Preferred polysulfide adhesives can be formed by reaction of a thiol terminated polysulfide with a di- or polyfunctional epoxide such as the diglycidyl ether of bisphenol-A. Alternatively, the polymerization can be effected by reaction of the terminal thiol groups with an olefin such as by the reaction with polyethylene glycol dimethacrylate. Curing agents for curable polysulfides also include manganese dioxide, lead dioxide, antimony trioxide, and tellurium dioxide.

Further, the present invention is also applicable to adhesive and sealant compositions based upon silicone materials. These have a silicon-containing group which has a hydroxyl group or a hydrolytically unstable group bound to a silicon atom and can be crosslinked with formation of siloxane bonds. Suitable curing agents include tin octoate, lead octoate, and dibutyltin dilaurate. These curable compositions are particularly useful as sealing compositions where weathering resistance and heat resistance is important.

As noted above, the curable compositions may comprise mixtures of monomers, oligomers and/or prepolymers of the same general chemical class or of different classes so long as the systems are compatible and the resultant cured or polymerized adhesive or sealant has efficacious properties. Where combinations or mixtures of monomers, oligomers and/or prepolymers are used, there are three mechanisms by which the secondary component is incorporated with or into the composition of the primary curable component. First, the second polymerizable component may have a plurality of reactive or functional sites for co-reacting or co-polymerizing with the first component. Second, the second component may have polar groups such as oxygen, amine, ether, ester, hydroxyl, ketone, epoxy or carboxyl, which form hydrogen bonds with the cured or polymerized primary component. Third, the second component may be such as to stericly entangle or hinder the movement of opposing chains of the primary component.

Suitable secondary components which co-react or co-polymerize with the primary curable component include, for example, allyl(meth)acrylates, alkene glycol di(meth)acrylates, alkyldiol di(meth)acrylates, alkoxy alkanol di(meth)acrylates, and trialkanol tri(meth)acrylates, especially allyl (meth)acrylate, triethylene glycol di(meth)acrylate, ethylene glycol di(meth)acrylate, tetraethylene glycol di(meth)acrylate, polyethylene glycol di(meth)acrylate; 1,4-butanediol di(meth)acrylate, diethylene glycol di(meth)acrylate, 1,6-hexanediol di(meth)acrylate, neopentyl glycol di(meth)acrylate, polyethylene glycol di(meth)acrylate, 1,3-butylene glycol di(meth)acrylate, tripropylene glycol di(meth)acrylate, ethoxylated bisphenol di(meth)acrylate, dipropylene glycol di(meth)acrylate, alkoxylated hexanediol di(meth)acrylate, alkoxylated cyclohexane dimethanol di(meth)acrylate, pentaerythritol tri(meth)acrylate, and the like, and mixtures thereof. Of course other suitable materials include those previously mentioned with respect to each class of polymerizable component. Exemplary secondary components having polar groups for forming hydrogen bonds include, for example, alkoxy acrylate, alkoxy methacrylate, polyester acrylate, polyester methacrylate, acrylalkoxy phthalic acid, methacrylalkoxy phthalic acid, glycidyl methacrylate, glycidyl acrylate, cycloalkoxy acrylate, cycloalkoxy methacrylate, and the like. Finally, suitable secondary components that result in steric entanglement or that stericly hinder the movement of opposing chains of the forming adhesive polymer include, for example, alkyl(meth)acrylates of greater than 14 carbons, cycloalkyl(meth)acrylates, multicyclic alkyl(meth) acrylates, aralkyl(meth)acrylates, cycloalkoxy(meth)acrylates and the like. Specific examples include stearyl acrylate, stearyl methacrylate, isobornyl methacrylate, benzyl acrylate, cyclohexyl methacrylate, and cetyl acrylate.

Optionally, the curable compositions may further contain a terpene resin, including, for example, wood rosin resins, esters of gum rosin, styrenated terpene, and terpene phenolic resins. Such terpene resins function as tackifiers. Additionally, the adhesive strength of the curable composition on oily metal sheets may be improved by the inclusion of liposoluble additives, such as limonene, dipentene, terpene resins, or oil of turpentine, in an amount of 1-10 percent by weight, relative to the weight of the curable composition. Other optional ingredients include dyes, stabilizers, inhibitors, thickeners and the like.

The foregoing sets forth but a brief overview of the myriad of curable compositions to which the present invention is applicable and is not intended to be limiting to the aforementioned classes of curable compositions nor to the specific polymerizable components mentioned therein. And, of course, such compositions may optionally contain other additives such as dyes, pigments, plasticizers, stabilizers, solvents, surfactants, emulsifying agents and the like, as is well known to those skilled in the art. Additional curable compositions which can be modified in accordance with the teaching of the present invention to provide the benefits and attributes of the present invention are well know and readily recognized by those skilled in the art. Exemplary curable compositions are further disclosed in, for example, Mandi et. Al. (US 20020010272), Bachmann et. al. (U.S. Pat. No. 3,814,156), Chemack (U.S. Pat. Nos. 4,940,852 and 4,808,639), Wallace (U.S. Pat. Nos. 4,428,982 and 4,081,012), Krieble (U.S. Pat. Nos. 3,489,599 and 3,746,068), Newell (U.S. Pat. No. 4,252, 708); Kropp et. al. (U.S. Pat. No. 6,573,328), Matsuo (U.S. Pat. No. 6,025,074); Fryd et. al. (U.S. Pat. No. 4,980,410); Azevedo (U.S. Pat. No. 4,417,028), Cooke et. al. (U.S. Pat. No. 4,497,916), Chao (U.S. Pat. No. 6,375,872); Usami et. al. (U.S. Pat. No. 5,397,812), Wolinski et. al. (U.S. Pat. No. 4,126,504), Siebert et. al. (U.S. Pat. Nos. 5,140,068 and 5,157,077), Deckert et. al. (U.S. Pat. No. 3,746,068), Hart et. al. (U.S. Pat. No. 4,536,524), Earls et. al. (U.S. Pat. No. 5,510,431), Hilbelink et. al. (U.S. Pat. No. 3,725,501), Sweeney (U.S. Pat. Nos. 4,830,558 and 4,555,206) and Rich et, al. (U.S. Pat. Nos. 5,635,546 and 5,853,520), among others, all of which are hereby incorporated herein by reference.

The methods by which the curable compositions of the present invention are prepared depend upon the form and method of application of the curable composition itself. For liquid or thickened adhesive and sealant compositions, the encapsulated carrier particles are merely blended into the liquid curable composition by any of the known and commercially employed techniques. Preferably such compositions are thickened naturally or by the addition of suitable thickening agents and/or thixotropic materials such as fumed silica, so that the encapsulated carrier particles do not settle out during storage. Alternatively, such curable compositions should be shaken or stirred prior to application of the same.

Where the curable compositions are to be employed in a pre-applied manner, i.e., applied to a substrate in stock form and stored prior to use, e.g., applied to nuts or bolts at a factory or site of conversion for subsequent use at another location, the encapsulated carrier particles will be dispersed in the liquid curable component, applied to the substrate and a polymer film, which may be derived from the liquid curable composition, formed thereon or, preferably, the liquid curable component is also encapsulated and both the encapsulated liquid curable component and the encapsulated carrier particles are dispersed in a suitable binder which is used to adhere the capsules to the substrate. With the former, following application of the liquid curable composition of the present invention to a substrate, a thin film of a liquid polymerizable material or a solution of a film forming material is applied so as to cover the underlying liquid curable composition thereby encasing or enveloping the liquid curable composition between the film and the substrate. It is also possible that the protective film may be derived from the curable composition itself. In this instance, the curable composition also contains a suitable photoinitiator and/or photosensitizer whereby, upon exposure to the appropriate radiation, preferably UV light, surface cure of the liquid curable component is initiated. Such curable compositions may also contain an appropriate UV screening agent to ensure that only a thin, surface film of material cures or polymerizes. Such systems are taught in or readily derived from the teachings of Ozono (U.S. Pat. No. 4,588,639) and Wallace (U.S. Pat. No. 4,428, 982), herein incorporated by reference, among others and are well known to those skilled in the art.

Typically, however, and preferably, both the liquid curable components and the curative therefore will be encapsulated and the microcapsules dispersed in an appropriate binder. The choice of the binder will be dictated by the composition of the wall material and the composition of the substrate. The binder system may be a curable binder system using the same or similar curable or polymerizable materials as are useful for forming the shell wall and/or the adhesive or sealant. Suitable curable binder systems include those based on the reaction of an anhydride and arylenes, alkylenes, alkoxylenes, alkarylenes, aralkylenese, alkoxyalkylenes, aryloxyalkylenes and aryloxyarylenes. Suitable binders also include water-soluble binding agents such as polyvinyl alcohol, styrene-maleic anhydride copolymers and gelatin as well as solvent soluble binding agents such as chloroprene, polyester acrylates, urethane acrylates, carboxyl- or hydroxy-modified vinylchloride-vinylacetate copolymer, cellulose actetate, epoxides, polyterpenes, hydroxypropylcellulose, hydroxyethylcellulose, sodium carboxymethylcellulose, poly(glycolic acid), poly(lactic acid), copolymers of the foregoing, poly(aliphatic carboxylic acids), polycaprolactone, poly(acetals), polylactic acid-caprolactone), poly(glycolic acid-caprolactone), polyanhydrides, albumin, casein, butyrate resins, polyvinylacetate, polyesters of dibasic acids and dials, polyvinylchloride, polyvinylbutyral, polyvinyl formal, varnish-based and tar-base resins, and waxes and the like. Organic solvents for the latter include chlorinated solvents such as trichloroethylene, trichloroethane, methylenechloride; chlorinated/fluorinated hydrocarbons solvents such as monofluorotrichloroethane and dichlorodifluoroethylene; hydrocarbon solvents such as hexane, and pentane; alcohols such as ethanol and isopropanol, and lacquer solvents such as methyl ethyl ketone, toluene, and benzene. Additional binder systems are disclosed in, for example, Park et, al. (U.S. Pat. No. 5,827,924), Matsuo (U.S. Pat. No. 6,025,074), and Bachmann et. al. (U.S. Pat. No. 3,814,156), herein incorporated by reference and elsewhere and are well known to those skilled in the art.

Particularly desirable binder systems are those that are photopolymerizable, i.e., cure or polymerize upon exposure to light, preferably UV light. Such binder systems may comprise any of the above-mentioned free-radically curable monomers, oligomers and/or pre-polymers and an appropriate photoinitiator therefore and/or a photosensitizer. Suitable photoinitiators include, among others, benzoin and its derivatives, benzophenones and their derivatives, xanthenes, benzyl, benzilketals (especially benzildimethylketal), acetophenones and their derivatives (especially α,α-diethoxyacetophenone), α-hydroxyalkylphenones, o-acyl-α-aminoketones, acylphosphine oxides (especially 2,4,6-trimethylolbenzoyldiphenyphosphine oxide) and acylphosphonates. Additional photoinitiators include substituted pyrylium salts or anthracene and derivatives thereof, e.g., substituted anthracenes, or anthraquinone or ketocoumarine derivatives. Photoinitiators are typically used in an amount within the range of about 0.5% to about 10% by weight based on the weight of the binder composition, with about 2% to about 4% or greater by weight of the total binder composition being desirable. Alternatively or in addition, the photopolymerizable binder may include a photosensitizer. Suitable photosensitizers include benzophenone or dyes like eosin, fluorescein, thiazole dyes, thiazine dyes, oxazine dyes, azine dyes, aminoketone dyes, xanthene dyes, acridinium dyes or phenazine dyes. Inclusion of such photosensitizers often lessens the intensity and/or duration of exposure to the radiation used to initiate cure. As a general guide, for photo-initiated polymerizations, it is also desirable to use a photo-initiated radical generating component, such as peroxides, peresters, azo compounds and derivatives, benzoin derivatives, alpha-halo acetophenones, or acylphosphine oxides, in an amount within the range of about 0.005% to about 4% or greater (desirably within the range of about 0.01% to about 1.5%) by weight of the total binder composition. Though the foregoing discussion has been primarily with respect to free-radical photopolymerization, it is also understood that suitable binder systems may be photoionically activated as well. Suitable cationic photoinitiators include the iodonium salts, especially the diaryliodonium salts. Such iodonium salts are described in U.S. Pat. Nos. 3,729,313; 3,741,769; 3,808,006; 4,250,053 and 4,394,403. The iodonium salt can be a simple salt, containing an anion such as chloride, bromide, iodide, antimony pentafluoride or arsenic hexafluoride or the like. Mixtures of iodonium salts can be used if desired. Typically the iodonium cationic photoinitiators are used in combination with a sensitizer and an electron donor compound. Accordingly, selection of a particular iodonium salt may depend to some extent upon the particular polymerizable component, sensitizer and donor chosen.

The binder compositions may also include other ingredients including curatives and additives for the adhesive or sealant composition provided that in the case of curatives, the curative contained in the binder is not such that premature rupture of the microcapsules containing the curable components of the curable compositions will allow premature curing or polymerization thereof. Thus, for example, an accelerator may be dispersed in the binder so long as the initiator for the given curable composition is in the encapsulated carrier or another encapsulated component of the curable composition.

The amount of the encapsulated cure system to be incorporated into or employed with the curable composition depends upon a number of different parameters including the type of curable composition, i.e., whether it is an addition polymerizable system or a step growth polymerization system; the state of the curable composition, i.e., whether it is a liquid system or a fully encapsulated system that is applied in a binder, the degree of polymerization or cure desired; the amount and/or stoichiometry of the curable components, the amount of curative in the carrier particles, and the like. Those skilled in the art will readily recognize or be able to determine the proper level of incorporation. Most often one would employ that amount of the encapsulated cure system which contains the same amount of curative as would be employed were the carrier not present.

In the case of the pre-applied adhesive and sealant compositions, the amount of the encapsulated cure system to be incorporated into the binder system also is influenced by the method and rate of application of the pre-applied composition as well as the composition of the binder. Binder compositions comprising a binder polymer in solution will generally have lower levels of the encapsulated components (both cure systems and curable components) than liquid curable binder systems based on the total weight of the binder system. Typically it is preferred to minimize the amount of the binder material while concurrently maximizing the amount of the encapsulated components (again cure systems and curable components) to allow for optimal bond or seal capabilities. Generally speaking, the amount of the encapsulated cure system to be combined with the other microencapsulated components will be consistent with that level used with conventional encapsulated adhesive and sealant compositions. However, it is also believed that lower levels may be employed due to the higher degree of or more efficacious mixing of the curative with the curable composition during activation.

The curative within the encapsulated cure system of the present invention is released and/or made available by high shear, especially high shear mixing which masticates or kneads the carrier or, in the case of a carrier which flows upon exposure to heat, moderate shear mixing. The specific method by which this occurs depends upon the carrier, whether the encapsulated cure system is part of a liquid adhesive or sealant composition or part of a pre-applied adhesive or sealant composition and, in the latter instance, the nature of the substrate to which the preapplied material is applied. For example, for liquid curable compositions comprising the encapsulated cure system, cure of the curable composition may be effected by dispensing or applying the curable composition through a mixer nozzle which employs a high shear mixing element or an element similar to a screw in an extrusion barrel. Alternatively, a bead of the liquid curable composition containing the encapsulated carrier therein may be laid upon a substrate and subjected to mixing or mastication with a mixer blade or series of blades. The latter may also be in the form of a plurality of stationary dams wherein as the substrate with the bead thereon, passes the dams, the dams act to move and knead the bead so as to expose the curative and allow intimate mixing thereof with the components of the curable composition.

Where the carrier in the liquid curable composition is a hot melt, a wax material or a heat sensitive material, the nozzle will have a heating element in combination with a mixer element, which may or may not be high shear mixer element, whereby the carrier is transformed to a softened or flowable state by the heat generated by the heating element. Alternatively, in following with the last sentence of the preceding paragraph, the blade and/or dams may be heated so the heat sensitive material is rendered pliable and/or flowable concurrent with the mixing with the curable composition.

In the case of preapplied adhesive or sealant compositions, the cure or polymerization of the curable composition may be effected by a mixer blade which is repetitively passed through or across the preapplied curable composition. In high-speed industrial process, the adhesive may be passed by a stationary or reciprocating blade or mixer element, which may or may not be heated. In the case of a stationary element, the element may itself comprise a series of dam-like structures that act similar to a plow, pushing and mixing the pre-applied curable composition as it is scraped from the substrate surface. In both instances, because the adhesive mix has a high viscosity, due largely to the carrier component and/or the presence of thickening or viscosity enhancing additives, the initiated curable composition passing from the mixer portion is often in the form of raised ridges so that when two substrates are brought into contact with the initiated curable composition, the same will contact both substrate surfaces: thus, filling the gap, especially between uneven substrate surfaces.

The key aspect of the mixer element is that it kneads or masticates the curable composition so as to ensure rupture of the shell wall and, more importantly, repeated mashing or kneading of the carrier so as to expose more and more of the entrained curative.

As noted above, because of the high viscosity of the activated adhesive and sealant compositions, it is possible that the same may be applied as or, depending upon the means by which the composition is activated, arise from the activation step as a raised bead or plurality of beads of the activated material. This characteristic enables one to apply a thin film of the pre-applied adhesive to a given stock material which is then stored for subsequent use. Because the adhesive is applied in a thin layer, the stock materials may be stacked high without concern that adhesive on one end will cause a stack to lean and fall over. While some stock materials already have thin films of a reactivatable adhesive material applied to their surface, the thickness of the bond is limited to the thickness of the pre-applied reactivatable adhesive film. In the present invention, however, because of the physical and rheological properties of the activated adhesive and sealant compositions, one is able to make raised beads of the same so that uneven surfaces and gaps can be accommodated. Applications which conventional pre-applied films cannot address.

The following non-limiting working examples exemplify and provide additional scope and understanding to the present invention.

Encapsulated Cure Systems

A number of novel encapsulated cure systems (hereinafter also referred to as "ECS"s) according to the practice of the present invention were made in a multi-step process which involved the preparation of the internal phase of the ECS microcapsules, i.e., the carrier material or, if the carrier were to be polymerized in-situ, the precursors therefore and the curative contained therein, followed by one or more wall forming or encapsulation steps. Generally speaking, the internal phase was prepared by adding the plasticizers, polymeric thickeners and/or tackifier resins to the polymerizable monomer in an appropriate vessel or beaker and stirring the combination at room temperature until all solids were dissolved in the monomer. Thereafter, the more thermally sensitive components, especially the curatives to be incorporated into the carrier, e.g., the peroxide and azo initiators, were then added to the mixture under constant agitation or mixing and at an elevated temperature, generally 45° C., until all solids were fully dissolved, or substantially so. The first mixing step was performed at room temperature as dissolving the resin in the monomer does not appear to be temperature dependent and is quite lengthy. On the other hand, the mixing of the curatives is more temperature dependent and, thus, here the elevated temperature is preferred. Of course, one could add all ingredients at an elevated temperature and in a different sequence; however, due to the slow rate at which the resins dissolve in the monomer, such higher temperatures for extended periods may adversely affect the potency or efficacy of the curatives. The various materials used in the preparation of the encapsulated cure systems as well as the curable compositions comprising the same were as presented in Table 1.

TABLE 1

| Tradename | Acronym | Chemical Description | Source Company | |
|---|---|---|---|---|
| Acrysol TT-615 | | acrylic alkali thickener | Rohm & Haas | Philadelphia, PA |
| C-121 | PAA | polyacrylic acid colloid solution | Rhone Poulenc | Marrietta, GA |
| | CHP | cumene hydroperoxide | Atofina Chemicals | Philadelphia, PA |
| CN551 | | amine modified polyether acrylate oligomer | Sartomer Company | Eaton, PA |
| CN501 | | amine modified polyether acrylate oligomer | " | " |
| CN2404 | | metallic acrylate oligomer | " | " |
| Cycat 500 | | sulfonic acid catalyst | Cytec Industries | West Patterson, NJ |
| CYM M-100 | | 3,4-epoxycyclohexylmethyl methacrylate | Daicel Chemical | |
| Cymel 385 | | partially methylated methylol melamine resin sol'n | " | " |
| CALFAX DBA-70 | | dodecyldiphenyloxide disulfonic acid | Pilot Chemicals | Sante Fe Springs, CA |
| | DEGDMA | diethylene glycol dimethacrylate | | |

TABLE 1-continued

| Tradename | Acronym | Chemical Description | Source Company | |
|---|---|---|---|---|
| Disparlon 6650 | | polyamide thixotropic agent | King Industries | Norwalk, CT |
| | DNNDSA | dinonyl naphthalene disulfonic acid | | |
| | EHDMAB | ethylhexyl dimethylamino benzoate | | |
| Escorez 5300 | | hydrogenated hydrocarbon resin | Exxon Mobil | Houston, TX |
| Indopol H-100 | | polybutene resin plasticizer | Innovene | Naperville, IL |
| Indopol H-300 | | " | " | " |
| Indopol H-1900 | | " | " | " |
| I6-B | | red carbonless coloring agent | | |
| Jayflex DIOP | | di-isooctyl phthalate | Exxon Mobil | Houston, TX |
| Jonacryl 3050 | | styrene acrylic latex emulsion | Johnson Polymer | Sturtevant, WI |
| K-702 | | polyacrylic acid | Noveon | Cleveland, OH |
| Luprox A-75 (75% BPO) | | benzoyl peroxide | Atofina Chemicals | Philadelphia, PA |
| Luprox P | | t-butyl peroxybenzoate | Atofina Chemicals | Philadelphia, PA |
| | MEHQ | methyl ethyl hydroquinone | | |
| Norpar 12 | | aliphatic hydrocarboin fluid | Exxon Mobil | Houston, TX |
| Norsolene A-110 | | aliphatic modified C-9 hydrocarbon resin | Sartomer Company | Eaton, PA |
| Norsolene A-90 | | " | " | " |
| Norsolene S-105 | | aromatic hydrocarbon resin | " | " |
| Norsolene S-85 | | " | " | " |
| | PHZBSA | para-hydrazinobenzene sulfonic acid | | |
| | PHBSA | para-hydroxybenzene sulfonic acid | | |
| | PVA | polyvinylalcohol | | |
| SR213 | BDDA | 1,4-butanediol diacrylate | " | " |
| SR238 | HDDA | 1,6-hexanediol diacrylate | " | " |
| SR256 | EEEA | 2-(2-ethoxyethoxy)-ethyl acrylate | " | " |
| SR257 | SA | stearyl acrylate | " | " |
| SR295 | PETTA | pentaerythritol tetraacrylate | " | " |
| SR351 | TMPTA | trimethylolpropane triacrylate | " | " |
| | TMPTA/I6-B | 1% I6-B in SR351 | | |
| SR355 | DTMPTTA | di-trimethylolpropane tetraacrylate | " | " |
| SR399 | DPEPA | dipentaerythritol pentaacrylate | " | " |
| SR440 | IOA | iso-octyl acrylate | " | " |
| SR444 | PETA | pentaerythritol triacrylate | " | " |
| SR495 | CLA | caprolactone acrylate | " | " |
| SR506 | IBA | isobornyl acrylate | " | " |
| SR604 | PPGMMA | polypropylene glycol monomethacrylate | " | " |
| Sarcure SR1135 | | photoinitiator | " | " |
| Sylvares ZT105LT | | styrenated terpene resin | Arizona Chemical | Jacksonville, FL |
| Sylvalite RE 105L | | resin ester tackifier | " | " |
| Tinuvin 234 | | benztriazole UV absorber | Ciba Specialty Chemicals | Tarrytown, NY |
| Tinuvin 328 | | " | " | " |
| TT-615 | | polyacrylate | Rohm & Haas | Philadelphia, PA |
| Vazo 52 | | 2,2'-azobis (2,4-dimethyl valeronitrile) | DuPont | Wilmington, DE |
| Wingtak 10 | | liquid hydrocarbon tackifier | Goodyear Chemical | Beaumont, TX |

Encapsulation of the ECS internal phase was accomplished by a one-, two- or three-phase, multi-step process, preferably, the two-phase, multi-step process. Unless otherwise indicated, all encapsulation processes were conducted in a jacketed steel vessel or reactor under a nitrogen blanket having integrated agitation means for ensuring good mixing of the components therein. The two-phase encapsulation process involved the following general steps:

An intimate mixture of a colloidal polyacrylic acid (C-121 . . . ), sodium hydroxide (5% solution) and water was prepared in the reaction vessel.

Thereafter a partially methylated methylol melamine resin solution (Cymel 385) was added to the above mixture under constant agitation. Due to the high viscosity of this material, its addition was typically accomplished over a four-minute period.

Following completion of the addition of the melamine resin, the ECS internal phase material was then added to the mixture under constant agitation.

Once the ECS internal phase material was intimately mixed in, generally after about 16 minutes or so, the reaction mix was subjected to high shear conditions at room temperature or, preferably, at a slightly elevated temperature to achieve the desired particle size for the droplets of the ECS internal phase material. High shear or emulsification conditions were achieved by the use of an integrated or inserted impeller mechanism. Particle size determinations were made periodically to assess the progress of the emulsification.

Shortly before the completion of the emulsification process, generally about five minutes before, the wall forming composition for the second phase encapsulation process was prepared. As before, the second phase wall forming composition was prepared by adding the partially methylated methylol melamine resin to a mixture comprising the colloidal polyacrylic acid, sodium hydroxide and water.

Approximately five minutes following cessation of the emulsification process, the prepared second phase wall forming composition was added to the mixture, which, all the while, is maintained under constant agitation.

Following the addition of the second phase wall forming composition a salt, preferably sodium sulfate, was then added to the mixture to complete the encapsulation process.

Thereafter, the temperature of the reaction mix was gradually elevated to the desired reaction temperature over a period of about two hours or less, preferably about an hour or less, and maintained at the elevated temperature for an extended period of time to ensure complete formation of the capsule walls as well as polymerization of the ECS internal phase materials.

Obviously, the foregoing sequence is but one of many that could be applied to the practice of the present invention and those skilled in the art will readily recognize that many modifications and variations thereto could also be employed successfully. For example, the wall forming material and the ECS internal phase materials could be added concurrently or in reverse sequence. However, the specified sequence is especially desirable as it is believed that the wall forming material may aid in the emulsification process of the internal phase materials. Furthermore, the timing of the emulsification process will vary depending upon a number of factors including the type, size and shape of the impeller blade itself, and the speed of the same. While higher shear provides for smaller particle size, those skilled in the art will readily recognize that after a given point in time, continued high shear mixing will not lead to any further material change in particle size. Particle size determinations were made during and following the encapsulation process using an Accusizer model 780 particle size instrument made by Particle Sizing Systems.

EXAMPLES 1-19

A number of different microencapsulated novel activator systems according to the practice of the present invention were prepared. In each of these examples the carrier was polymerized in-situ concurrent with or following encapsulation. The materials used in the examples The formulations of the internal phase of the ECS microcapsules were as shown in Table 2, all amounts are presented in grams. Except as indicated below, the ECS microcapsules were prepared in accordance with the aforementioned two-phase encapsulation process using the cell forming materials of Table 3 under the reaction conditions and times of Table 4. Table 4 also sets forth the physical attributes, namely the average particle size and cell wall content, of the microcapsules formed.

Unlike the other examples of this series, Example 3 employed a two-stage heat cycle in bringing the final reaction mix to the final reaction temperature. Specifically, as indicated in Table 4, the reaction mix was initially elevated to a temperature of 45° C. and held at that temperature for a period of ten minutes following which it was then elevated to 80° C. and held at that temperature overnight to allow the internal phase materials to polymerize.

In Example 8, the ECS internal phase was added to the wall forming pre-mix of polyacrylic acid, sodium hydroxide and water and emulsified for a period of 45 minutes after which the wall forming melamine resin was added and the mixture emulsified for an additional 30 minutes.

Finally, Example 18 employed a two-stage carrier polymerization wherein the initial stage was conducted at 65° C. for a period of 6 hours, as indicated in Table 4, following which the temperature was elevated to 80° C. and the reaction continued for another 6 hour period.

TABLE 2

Examples 1-19
Internal Phase Composition

| Example | 1 | 2 | 3 | 4 | 5 | 6 | 7 | 8 | 9 | 10 |
|---|---|---|---|---|---|---|---|---|---|---|
| iso-octyl acrylate | 123 | 187 | 110 | 263.6 | 291.8 | 62.5 | 107.2 | 144 | 140 | 49.5 |
| PPGMMA | | | 14.55 | 131.8 | 145.9 | 50 | 15 | 2.5 | 10 | 25 |
| stearyl acrylate | | | | 131.8 | 145.9 | 37.5 | | | | 75 |
| TMPTA | 2.5 | 0.5 | 2.03 | 2 | 1.16 | | 4.5 | 3.5 | | 0.5 |
| ion exchange resin | | | | 5 | | 20 | | | | |
| triacetin | | | | | | | | | | |
| Sylvares ZT105LT | 125 | 50 | | | | | | | | |
| Sylvalite RE 105L | | | | | | | | | 100 | |
| Norsolene A-110 | | | | | | 100 | | | | |
| Norsolene A-90 | | | | | | | | | | |
| Norsolene S-105 | | | 100 | 350 | 400 | | 103 | | | |
| Norsolene S-85 | | | | | | | | | | 100 |
| Escorez 5300 | | | | | | | | | 100 | |
| Indopol H-300 | | 12.5 | 29.12 | | | | | | | |
| methyl palmitate | | | | | | | | | | |
| di(iso-octyl) phthalate | | | | | | | | | | |
| Luprox A-75 (75% BPO) | | | | 35 | 40 | 33.3 | 10.3 | 40 | 33.3 | 33.3 |
| benzoyl peroxide | 4 | 5 | | | | | | | | |
| Luprox P | | | | | | | | | | |
| cumen hydroperxide | | | 30 | 105 | 120 | | 60 | | | |
| Vazo 52 | | | 0.5 | | | | | | | |
| PHZBSA | | | | | | | | | | |
| EDMAB | | | | | | | | | | |
| total wt. (grams) | 254 | 255 | 291.2 | 1019 | 1165 | 283.3 | 300 | 290 | 283 | 283 |

| Example | 11 | 12 | 13 | 14 | 15 | 16 | 17 | 18 | 19 |
|---|---|---|---|---|---|---|---|---|---|
| iso-octyl acrylate | | | 75 | | 50 | 401.9 | 104 | 103 | 88.5 |
| PPGMMA | | | | 49 | 50 | 58.2 | 15 | 14.6 | 15 |
| stearyl acrylate | 100 | 150 | 75 | 100 | 50 | | | | |
| TMPTA | | | | 1 | | 8.12 | 2.7 | 2.04 | 2.1 |
| ion exchange resin | | | | | | 20 | | | |
| triacetin | | | | | | | | | 15 |
| Sylvares ZT105LT | | | | | | | | | |
| Sylvalite RE 105L | | | | | | | | | |
| Norsolene A-110 | | 100 | | 100 | 100 | | | | |
| Norsolene A-90 | 100 | | | | | | | | |

TABLE 2-continued

Examples 1-19
Internal Phase Composition

|  |  |  |  |  |  |  |  |  |  |
|---|---|---|---|---|---|---|---|---|---|
| Norsolene S-105 |  |  | 100 |  |  | 400 | 103 | 100 | 103.5 |
| Norsolene S-85 |  |  |  |  |  |  |  |  |  |
| Escorez 5300 |  |  |  |  |  |  |  |  |  |
| Indopol H-300 |  |  |  |  |  | 116.5 |  | 29.1 | 30 |
| methyl palmitate | 50 |  |  |  |  |  |  |  |  |
| di(iso-octyl) phthalate |  |  |  |  |  |  |  | 30 |  |
| Luprox A-75 (75% BPO) | 33.3 | 33.3 | 33.3 | 33.3 | 33.3 | 40 | 10.3 |  | 18 |
| benzoyl peroxide |  |  |  |  |  |  |  |  |  |
| Luprox P |  |  |  |  |  |  |  |  | 27 |
| cumen hydroperxide |  |  |  |  |  | 120 | 60 |  |  |
| Vazo 52 |  |  |  |  |  |  |  | 9.76 |  |
| PHZBSA |  |  |  |  |  |  | 5.16 |  |  |
| EDMAB |  |  |  |  |  |  |  |  | 2.33 |
| total wt. (grams) | 283 | 283 | 283 | 283 | 283 | 1165 | 300 | 291 | 299.1 |

TABLE 3

Examples 1-19
Cell Wall Materials

| Example | 1 | 2 | 3 | 4 | 5 | 6 | 7 | 8 | 9 | 10 |
|---|---|---|---|---|---|---|---|---|---|---|
| Cell wall Phase I |  |  |  |  |  |  |  |  |  |  |
| Cymel 385* | 4 | 4 | 10 | 35 | 40 | 6 | 10 | 12 | 6 | 6 |
| C-121 | 5 | 5 | 22 | 70 | 88 | 7 | 22 | 7 | 7 | 7 |
| sodium hydroxide (5%) | 2 | 2 | 20 | 27.6 | 80 | 5.5 | 11 | 6 | 4 | 5.5 |
| sodium sulfate |  |  |  |  |  |  |  |  |  |  |
| water | 163 | 163 | 275 | 875 | 100 | 250 | 275 | 250 | 250 | 250 |
| Cell wall Phase II |  |  |  |  |  |  |  |  |  |  |
| Cymel 385 | 24 | 12 | 25 | 87.5 | 100 | 16 | 25 | 12 | 18 | 18 |
| C-121 | 5 | 5 | 5 | 17.5 | 20 | 7 | 5 | 7 | 7 | 7 |
| sodium hydroxide (5%) | 0.5 | 0.5 |  |  |  | 2.5 | 1 | 6 | 3 | 2.5 |
| sodium sulfate | 3 | 3 | 8 | 28 | 32 | 4 | 8 | 4 | 4 | 4 |
| water | 300 | 300 | 100 | 245 | 280 | 50 | 100 | 75 | 25 | 50 |

| Example | 11 | 12 | 13 | 14 | 15 | 16 | 17 | 18 | 19 |
|---|---|---|---|---|---|---|---|---|---|
| Cell wall Phase I |  |  |  |  |  |  |  |  |  |
| Cymel 385* | 6 | 6 | 6 | 6 | 6 | 40 | 10 | 10 | 10 |
| C-121 | 7 | 7 | 7 | 7 | 7 | 88 | 22 | 22 | 23 |
| sodium hydroxide (5%) | 5.5 | 5.5 | 5.5 | 5.5 | 5.5 | 80 | 26 | 20 | 12.5 |
| sodium sulfate |  |  |  |  |  | 32 |  |  |  |
| water | 250 | 250 | 250 | 250 | 250 | 1000 | 245 | 275 | 275 |
| Cell wall Phase II |  |  |  |  |  |  |  |  |  |
| Cymel 385 | 18 | 18 | 18 | 18 | 18 | 100 | 25 | 25 | 25 |
| C-121 | 7 | 7 | 7 | 7 | 7 | 20 | 5 | 5 | 5 |
| sodium hydroxide (5%) | 2.5 | 2.5 | 2.5 | 2.5 | 2.5 |  |  |  | 0.8 |
| sodium sulfate | 4 | 4 | 4 | 4 | 4 |  | 8 | 8 | 8 |
| water | 50 | 150 | 50 | 50 | 50 | 200 | 70 | 100 | 100 |

TABLE 4

Examples 1-19
Encapsulation Process

| Example | 1 | 2 | 3 | 4 | 5 | 6 | 7 | 8 | 9 | 10 |
|---|---|---|---|---|---|---|---|---|---|---|
| Milling |  |  |  |  |  |  |  |  |  |  |
| temp (o C.) | 25 | 25 | 25 | 45 | 45 | 45 | 45 | 45 | 45 | 45 |
| Time (min) | 75 | 75 | 24 | 15 | 15 | 75 | 17 | 45 | 75 | 75 |
| Rate (rpm) | 1100 | 1100 | 2800 | 1750 | 1800 | 2000 | 2250 | 1000 | 900 | 1500 |
| Ramp up of Reaction |  |  |  |  |  |  |  |  |  |  |
| intial temp (o C.) | 25 | 25 | 25 | 45 | 45 | 45 | 45 | 45 | 45 | 45 |
| end temp (o C.) | 90 | 90 | 45 | 68 | 68 | 65 | 68 | 65 | 65 | 65 |
| time (hrs)** | 2 | 2 | XX | XX | XX | XX | XX | XX | XX | XX |

TABLE 4-continued

Examples 1-19
Encapsulation Process

| Reacting | | | | | | | | | | |
|---|---|---|---|---|---|---|---|---|---|---|
| temp (o C.) | 90 | 90 | 45 | 68 | 68 | 65 | 68 | 65 | 65 | 65 |
| time (hrs) | 16 | 16 | 0.17 | 8 | 8 | 8 | 8 | 8 | 8 | 8 |
| Secondary Reaction | | | | | | | | | | |
| temp (o C.) | | | 80 | | | | | | | |
| time (hrs) | | | ONT* | | | | | | | |
| Average microcapsule | | | | | | | | | | |
| size (microns) | 47 | 34 | 19 | 9 | 13 | 18 | 29 | 36 | 64 | 37 |
| weight percent cell wall | 7.9 | 4.7 | 8.4 | 8.5 | 8.4 | 5.9 | 8.2 | 6.2 | 6.4 | 6.4 |

| Example | 11 | 12 | 13 | 14 | 15 | 16 | 17 | 18 |
|---|---|---|---|---|---|---|---|---|
| Milling | | | | | | | | |
| temp (o C.) | 45 | 45 | 45 | 45 | 45 | 45 | 45 | 25 |
| Time (min) | 75 | 75 | 75 | 75 | 75 | 35 | 30 | 25 |
| Rate (rpm) | 2400 | 1500 | 1200 | 2000 | 2400 | 1750 | 2650 | 2400 |
| Ramp up of Reaction | | | | | | | | |
| intial temp (o C.) | 45 | 45 | 45 | 45 | 45 | 45 | 45 | 25 |
| end temp (o C.) | 65 | 65 | 65 | 65 | 65 | 65 | 68 | 65 |
| time (hrs)** | XX | XX | 1 | 1 | 1 | XX | XX | XX |
| Reacting | | | | | | | | |
| temp (o C.) | 65 | 65 | 65 | 65 | 65 | 65 | 68 | 65 |
| time (hrs) | 8 | 8 | 8 | 8 | 8 | 8 | 8 | 6 |
| Secondary Reaction | | | | | | | | |
| temp (o C.) | | | | | | | | 80 |
| time (hrs) | | | | | | | | 6 |
| Average microcapsule | | | | | | | | |
| size (microns) | 31 | 73 | 58 | 34 | 17 | 19.5 | 22 | 32 |
| weight percent cell wall | 6.4 | 6.4 | 6.4 | 6.4 | 6.4 | XX | 8.2 | 8.4 |

*ONT—overnight
**unless indicated, generally about 1 hour or less.

EXAMPLES 20-22

A second series of examples was prepared again using a two-phase encapsulation process except that no polymerizable wall forming materials were added during the second phase. As seen in Table 5, which sets forth the composition of the ECS internal phase as well as the components of the wall forming materials, the second phase of the encapsulation process merely added a solution of sodium hydroxide and sodium sulfonate in water. The reaction conditions and the physical attributes of the microcapsules formed were as set forth in Table 6. As seen in Table 6, Example 22, like Example 18 above, employed a two-stage carrier polymerization except here the initial polymerization stage was conducted at 65° C. for a period of 6 hours followed by a second stage wherein the reaction temperature was elevated to and maintained at 90° C. for a period of 16 hours.

EXAMPLES 23-25

Example 23 and Examples 24 and 25 demonstrate alternate encapsulation processes wherein encapsulation was achieved through a single phase or triple phase encapsulation process, respectively. The composition, process of production and resulting ECS microcapsule properties were as shown in Tables 5 and 6.

Adhesive Compositions

In order to demonstrate the efficacy and utility of the encapsulated cure systems of the present invention, a number of curable adhesive formulations were prepared incorporating several of the foregoing encapsulated carrier systems. Example 26 employs an ECS microcapsule in a one-part, liquid adhesive composition whereas the remaining examples all demonstrate the use of ECS microcapsules in a pre-applied adhesive formulation wherein the ECS microcapsule, an encapsulated curable composition (hereinafter also referred to as an "ECC") were combined in a binder system and applied to various substrates, allowed to dry or, as appropriate, cure, and subsequently activated.

TABLE 5

Examples 20-25
Internal Phase and Cell Wall Materials

| Example | 20 | 21 | 22 | 23 | 24 | 25 |
|---|---|---|---|---|---|---|
| Carrier | | | | | | |
| iso-octyl acrylate | 74 | 74 | | 75 | 124.3 | 149.3 |
| PPGMMA | 37.5 | 38 | 37.5 | 37.5 | | |
| isodecyl acrylate | | | 74 | | | |
| stearyl acrylate | 37.5 | 38 | 37.5 | 37.5 | | |
| TMPTA | 1 | 1 | 1 | | 0.75 | |
| DEGDMA | | | | | | 0.75 |
| Sylvares ZT105LT | | | | | 125 | 100 |
| Norsolene S-105 | 87.5 | 88 | 87.5 | 100 | | |
| Indopol H-300 | 12.5 | | 12.5 | | | |
| Indopol H-1900 | | 13 | | | | |

TABLE 5-continued

Examples 20-25
Internal Phase and Cell Wall Materials

| Example | 20 | 21 | 22 | 23 | 24 | 25 |
|---|---|---|---|---|---|---|
| Luprox A-75 (75% BPO) | 33.3 | 33 | 33.3 | 33.3 | 20 | 33.3 |
| cumen hydroperxide | 15 | 15 | 15 | 10 | | |
| Cycat 500 | | 7 | | | | |
| CALFAX DBA-70 | 4 | | 4.9 | | | |
| DNNDSA | | | | | 5 | |
| wt. (grams) | 302 | 305 | 303 | 298.3 | 270 | 283.3 |
| Cell wall Phase I | | | | | | |
| Cymel 385 | 32 | 24 | 21.4 | 24 | 4 | 6 |
| C-121 | 14 | 14 | 10.7 | 14 | 5 | 7 |
| sodium hydroxide (5%) | 13 | 14 | 15 | 10 | 2.5 | 5 |
| sodium sulfate | | | | 4 | | |
| water | 250 | 250 | 250 | 300 | 163 | 275 |
| Cell wall Phase II | | | | | | |
| sodium hydroxide (5%) | 5 | 5 | 6.15 | | 1 | 5 |
| sodium sulfate | 4 | 4 | 4 | | | |
| water | 95 | 70 | 95 | | 5 | 15 |
| Cell wall Phase III | | | | | | |
| Cymel 385 | | | | | 4 | 6 |
| C-121 | | | | | 5 | 7 |
| sodium hydroxide (5%) | | | | | 1 | 5 |
| sodium sulfate | | | | | 3 | 4 |
| water | | | | | 163 | 50 |

TABLE 6

Examples 20-25
Encapsulation Process

| Example | 20 | 21 | 22 | 23 | 24 | 25 |
|---|---|---|---|---|---|---|
| Milling | | | | | | |
| temp (o C.) | 45 | 45 | 45 | 45 | 45 | 45 |
| Time (min) | 75 | 75 | 75 | 75 | 75 | 75 |
| Rate (rpm) | 1000 | 1750 | 1250 | 3000 | 1100 | 1100 |
| Ramp up of Reaction | | | | | | |
| intial temp (o C.) | 45 | 45 | 45 | 45 | 45 | 45 |
| end temp (o C.) | 65 | 65 | 65 | 65 | 65 | 65 |
| time (hrs)* | XX | 1 | XX | 1 | 1 | XX |
| Reacting | | | | | | |
| temp (o C.) | 65 | 65 | 65 | 65 | 65 | 65 |
| time (hrs) | 8 | 8 | 8 | 8 | 8 | 8 |
| Secondary Reaction | | | | | | |
| temp (o C.) | | | 90 | | | |
| time (hrs) | | | 16 | | | |
| Average microcapsule size (microns) | 19 | 21 | 17 | 12 | 65 | 55 |
| weight percent cell wall | 7.8 | 6 | 5.5 | 6.1 | 2.3 | 3.3 |

*time not recorded, though about 1 hour or less.

Table 7 sets forth the internal phase of the various microcapsules containing the curable compositions as well as the make-up of the wall forming materials used in encapsulating the same. Generally, the process by which the ECC microcapsules were formed was as follows:

the components for the ECC internal phase were mixed under nitrogen blanket until all components were dissolved and held for subsequent use:

all components of the cell wall phase I, excluding the melamine resin, were added to a steel reactor at 25° C. and mixed under low shear; i.e., 300 rpm; thereafter the melamine resin was added and mixed at low shear for an additional 4 minutes.

the prepared ECC internal phase formulation was then added to the reactor and intimately mixed at 300 rpm for an additional 16 minutes;

the mixture was then subjected to high shear emulsification of 3000 rpm at 25° C. for 75 minutes. During this time, the second phase wall forming materials were prepared with the melamine being added to the remaining components of the second phase wall composition about five minutes prior to the completion of the emulsification step of the aforementioned reactor mix;

once the emulsification was completed, the mixture in the reactor was continually mixed with a flat paddle mixer at low shear, i.e., 300 rpm, approximately five minutes following cessation of the emulsification step, the second wall forming composition was added to the mixture followed by the sodium sulfate, if used;

thereafter, the reactor temperature was gradually raised to 65° C. over about two hours and the reaction mix maintained at 65° C. with low shear mixing for an additional 8 hours before the ECC microcapsules were recovered.

Although several of the pre-applied microencapsulated adhesive compositions employed aqueous based binders, several employed UV curable binder systems. The compositions of the various UV binder systems used in the following examples were as set forth in Table 8. These binders were prepared under ambient conditions, with care to preclude exposure to UV light, using traditional mixing equipment.

EXAMPLE 26

A one-part liquid curable adhesive composition was prepared by mixing together 6.7 parts by weight tetramethyl analine, 33.3 parts by weight of the encapsulated cure system prepared in accordance with Example 19 and 60 parts by weight of dipentaerythritol pentaacrylate (Sartomer SR399). A think film of the liquid adhesive composition was applied to an aluminum plate (0.75" by 4") and another aluminum plate placed over the same. The plates were rubbed together using about a one inch movement, while applying finger pressure, about 10-20 times. Thereafter, the assembly was allowed to stand for 5-10 seconds following which it was found that the assembly could not be separated, indicating that the adhesive had cured.

TABLE 7

| Curable Capsule | A | B | C | D | E | F | G | H | I | J | K |
|---|---|---|---|---|---|---|---|---|---|---|---|
| Internal Phase | | | | | | | | | | | |
| butyl ferrocene | 5 | 25 | 5 | | | | | | | | |
| Ferrocene | | | | 10 | 50 | 10 | 10 | | 10 | | |
| TMPTA | 245 | | | | 1100 | | | | 212.5 | | |
| DTMPTTA | | | | 220 | | | | | | | |
| PPGMMA | | | 25 | 12.5 | 62.5 | 12.5 | 12.5 | 12.5 | 12.5 | | 12.5 |
| PETTA | | | | | | 220 | | | | | |
| PETA | | | | | | | 220 | 228.13 | | 268.5 | 233.75 |
| TMPTA/I6-B | | 1212.5 | 217.5 | | | | | | | | |
| MEHQ | | 125 | 2.5 | | | | | | | | |
| EHDMAB | | | | | | | | 1.88 | | | |
| CHP | | | | | | | | | | 30 | |
| PHBSA | | | | | | | | | | 1.5 | |
| tetramethyl analine | | | | | | | | | | | 3.75 |
| Disparlon 6650 | | | | | | | | | 7.5 | | |
| Tinuvin 234 | | | | 3.75 | 18.75 | 3.75 | 3.75 | 3.75 | 3.75 | | |
| Tinuvin 328 | | | | 3.75 | 18.75 | 3.75 | 3.75 | 3.75 | 3.75 | | |
| Cell wall Phase I | | | | | | | | | | | |
| Cymel 385* | 4 | 70 | 14 | 14 | 70 | 14 | 14 | 14 | 14 | 16.34 | 14 |
| C-121 | 5 | 25 | 5 | 5 | 25 | 5 | 5 | 7.5 | 30 | | |
| K-702 | | | | | | | | | | 25.65 | 5 |
| sodium hydroxide (5%) | 2.5 | 1100 | 2.25 | 2.25 | 11.25 | 2.25 | 2.25 | 3.85 | 17.1 | | |
| sodium hydroxide (20%) | | | | | | | | | | 8.19 | 1.5 |
| sodium sulfate | | | | 3 | | 3 | | 3 | | 5 | |
| Water | 163 | 815 | 163 | 163 | 815 | 163 | 163 | 163 | 275 | 291.75 | 163 |
| Cell wall Phase II | | | | | | | | | | | |
| Cymel 385 | 24 | 70 | 14 | 14 | 70 | 14 | 14 | 14 | 14 | 16.34 | |
| C-121 | 5 | 25 | 3 | 5 | 25 | 5 | 5 | 5 | 5 | | |
| K-702 | | | | | | | | | | 5.84 | 5 |
| sodium hydroxide (5%) | 1.57 | 5 | 1 | 1 | 5 | 1 | 1 | 0.85 | 0.8 | | |
| sodium hydroxide (20%) | | | | | | | | | | 1.04 | 0.85 |
| sodium sulfate | 3 | 15 | 3 | | 15 | | 3 | | 3 | | 3 |
| Water | 163 | 500 | 100 | 100 | 500 | 100 | 100 | 75 | 100 | 116.7 | 100 |
| Cell wall Phase III | | | | | | | | | | | |
| Cymel 385 | | | | | | | | | | 22.4 | |
| C-121 | | | | | | | | | | 8.75 | |
| sodium hydroxide (5%) | | | | | | | | | | 0.9 | |
| sodium sulfate | | | | | | | | | | 3 | |
| Average microcapsule size (microns) | 5 | 12.6 | | 13.7 | 12.1 | 11.6 | 11.6 | 12.5 | 19.5 | | |

EXAMPLE 27

An aqueous based pre-applied adhesive composition was prepared by mixing together 4 parts by weight of a water solution containing 5% by weight polyvinyl alcohol and 5% by weight benzoyl peroxide, 2 parts by weight p-toluene sulfonic acid (p-TSA), 20 parts by weight of ECC microcapsule A, and 74 parts by weight of the encapsulated cure system prepared in accordance with Example 1. A piece of chipboard was pretreated with a coating of a 5% solution of polyvinyl alcohol using a #16 rod. The treated surface was then coated with the adhesive composition using a #50 rod. The coating was allowed to dry and then activated manually using a razor blade by stoking the edge of the blade with hand pressure quickly across the pre-applied adhesive 10 times. The chipboard was then folded on itself and held under hand pressure for 10 seconds. The chipboard remained bonded following release of the hand pressure.

EXAMPLE 28

A second aqueous based pre-applied adhesive composition was prepared by mixing together 15 parts by weight of styrene acrylic latex emulsion (Jonacryl 3050), 3.5 parts by weight sodium bicarbonate, 0.4 parts by weight polyacrylates (TT-615—Rohm & Haas), 52 parts by weight of the encapsulated cure system prepared in accordance with Example 6, 14.2 parts by weight of ECC microcapsule B and 14.2 parts by weight of ECC microcapsule C. The composition was applied as a thin film (0.006") to the clay side of clay-coated news back stock. The coating was allowed to dry and then activated manually using a razor blade by stoking the edge of the blade with hand pressure quickly across the pre-applied adhesive 10 times. The news back stock was then folded on itself using finger pressure to mimic the closure of a cereal carton flap. The news back stock remained bonded following release of the hand pressure and was found to have a strong bond when pulled apart after one minute. Fiber tear was observed upon pulling apart assemblies allowed to cure for 5 minutes and one hour.

EXAMPLES 29-36

A series of pre-applied adhesive compositions in UV curable binders were also evaluated employing the encapsulated cure system of the present invention. The make-up of these pre-applied compositions were as set forth in Table 9, with the composition of the encapsulated curable composition (ECC)

as set forth in Table 7, the composition of specific Binder System as set forth in Table 8 and the selection of the encapsulated cure system (ECS) as identified by the therein stated example number, e.g., ECS Cap 5 means the encapsulated cure system as prepared in Example 5.

In each of these examples, the adhesive composition was applied as a thin film strip, 0.5" wide by 0.006" thick along the centerline of the major axis of 3" wide by 5" long cards cut from paperboard cereal box stock. The adhesive was applied to the fiber side of the cards and cured under UV light. The adhesive was activated and the card bonded to a like card using a custom-made activator apparatus. The apparatus comprised an insertion station, an activator station and a bonding station with a rail extending from the insertion station, through the activation station and ending at the bonding station and a sled movable along the rail. In testing the prepared samples, a card with the adhesive pre-applied thereto is set on a sled, which is equipped with a vacuum, adhesive side up, with the major axis parallel with that of the rail. The sled then traverses along the rail at a rate of between 150 and 250 feet per minute, through the activator station where a stationary activator means having a face with one or more ridges, dams, or other structures which lift/scrape the adhesive from the card, thereby fracturing the microcapsules and mixing the contents thereof, and redeposit the activated adhesive on the card. The sled then traverses to the bonding station where a matching card is mated with the activated card at a pressure of about 5 psi applied for about 2 seconds. The bonded card assemblies were then allowed to sit for four weeks following which the ultimate peel adhesion and ultimate shear adhesion of each were determined. Tests were performed on five assemblies of each adhesive system and the results averaged and presented on Table 9.

Peel Adhesion and Shear Adhesion tests were performed under Tappi conditions using a Thwing-Albert EJA materials Tensile Tester with a 200 pound load cell. Instrument settings were as follows: test speed—12 inches per minute, sensitivity—0.5 pounds and gage length—1.75 inches. For testing, each sample was placed in a clamp, a modified vise grip, whose jaws extended the length of the card and overlayed the bond area, parallel to the bond, so as to stabilize the bond area prior to testing. The clamp was tensioned to provide an interference fit, but not pressure on the bondline. The clamped assemblies were then folded to prepare to the specific tests as follows:

Peel Test: For conducting the peel test, the exposed, unbonded "flaps" of the assembled cards extending from the clamp were folded back along the clamp edge, in opposite directions, and 90° to the assembled card in the clamp. An end view of the so folded card would give the image of a "T". The assembly is then centered in the jaws of the tensile tester, with each flap in opposing jaws. The assembly was then ready for testing.

Shear Test: For conducting the shear test, a corner of one of the exposed, unbonded "flaps" of the assembled cards was dog-eared and folded 90° to the card assembly: this produced a triangular dog ear on the card. A similar dog ear was then formed on the other card at the opposite end of the card assembly with that dog ear extending 90° to the card assembly, in the opposite direction of the first dog ear. Each jaw of the tensile tester was then attached to one of the dog ears. The assembly was then ready for testing.

TABLE 8

UV Curable Binder Systems

| Binder | L | M | N | O | P | Q | R |
|---|---|---|---|---|---|---|---|
| Sarcure SR1135 | 7.5 | 7.5 | 7.5 | 7.5 | 7.5 | 7.5 | 15 |
| Norsolene A-110 | 40 | 40 | 40 | 40 | 40 | 40 | |
| BDDA | | | | | | | 5 |
| EEEA | | | | | | | 10 |
| SA | 35 | 26 | 28 | 5 | 27 | 5 | |
| TMPTA | 5 | | | | | | |
| PPGMMA | | 10 | 10 | | 10 | | |
| HDDA | | 9 | 7 | | 8 | | |
| PETA | | | | | | | |
| IBA | | | | 15 | | 15 | 30 |
| CLA | | | | | | 5 | |
| CN2404 oligomer | 20 | 15 | 15 | | 15 | | |
| CN551 | | | | 25 | | 25 | |
| CN501 | | | | | | | 20 |
| Jayflex DIOP | | | | 10 | | 10 | |
| CYM M-100 | | | | 5 | | | |
| Indopol H-100 | | | | | | | 10 |
| Wingtak 10 | | | | | | | 10 |
| glyceryl tribenzoate | | | | | | | 7.5 |
| Norpar 12 | | | | | | | 7.5 |

EXAMPLE 37

A final pre-applied composition was prepared to demonstrate the efficacy of the compositions of the present invention in thread locking applications. In this case, a composition was prepared using 23 parts by weight of UV Binder R from Table 8, 20 parts by weight of ECC microcapsule K from Table 7 and 57 parts by weight of the encapsulated cure system of Example 19.

In order to test the efficacy of these compositions a 0.5" wide circumferential band of the adhesive composition was applied to the threads of a plurality of ½" long, ¼" diameter bolts. The coating was cured under UV light. Nuts were then threaded onto the bolts by hand until the nut advanced to the upper edge of the adhesive band. The assemblies were then allowed to set for several hours after which efforts to remove the nuts by hand were unsuccessful. Though the actual bond strengths were not measured, it is clear that the adhesive composition cured and formed an effective bond.

TABLE 9

Examples 29-36

| Example | 29 | 30 | 31 | 32 | 33 | 34 | 35 | 36 |
|---|---|---|---|---|---|---|---|---|
| Composition | | | | | | | | |
| UV Binder L | 43 | 43 | | 43 | | | | |
| UV Binder M | | | 43 | | | | | |
| UV Binder N | | | | | 43 | | | |
| UV Binder O | | | | | | 43 | | |
| UV Binder P | | | | | | | 43 | |
| UV Binder Q | | | | | | | | 43 |
| ECS Cap 5 | 37 | 32 | 37 | 37 | 37 | | | |
| ECS Cap 7 | | | | | | 37 | | |
| ECS Cap 16 | | | | | | | 32 | |
| ECS Cap 18 | | | | | | | | 37 |
| ECC Cap D | | | | | 20 | | | |
| ECC Cap E | | | 20 | | | | | |
| ECC Cap F | | | | 25 | | | | |
| ECC Cap G | 20 | 25 | | | | | | |
| ECC Cap G | | | | | | | | |
| ECC Cap H | | | | | | 20 | | |
| ECC Cap I | | | | | | | 25 | |
| ECC Cap J | | | | | | | | 20 |
| Peel Adhesion (lbs) | 4.4 | 4.4 | 3.5 | 3.5 | 3.74 | 4.9 | 3.5 | 4.9 |
| Shear Adhesion (lbs) | 101.1 | 93.4 | 46 | 87.5 | 50.6 | 70.7 | 45.3 | 48.7 |

While the present invention has been described with respect to aforementioned specific embodiments and examples, it should be appreciated that other embodiments utilizing the concept of the present invention are possible without departing from the scope of the invention. The present invention is defined by the claimed elements and any and all modifications, variations, or equivalents that fall within the spirit and scope of the underlying principles embraced or embodied thereby.

We claim:

1. An encapsulated cure system for curable compositions comprising:
   a) a carrier material,
   b) a curative contained in said carrier material, and
   c) a polymer capsule encasing said carrier material wherein the curative is (i) non-reactive with the carrier material in the encapsulate state, (ii) entrapped or substantially non-migratory in the carrier material and (iii) present at a concentration of at least 0.1 weight percent based on the weight of the carrier material and wherein the carrier is a natural or synthetic material or composition that is non-flowing to the extent that sufficient curative necessary to effect polymerization of a curable composition is not made available without altering the carrier to a flowable state and/or applying mechanical forces to the carrier to work the carrier and thereby expose or make available more of the entrapped curvative, wherein the carrier material is selected from the group consisting of hot melts, pressure sensitive adhesives, rubber materials, elastomer/tackifier compositions, a polymer whose Tg is less than 35° C., semi-solid and solid resins, starches and starch-based polymers, hydrogels, low temperature waxes and a thickened or gel-like mass of one or more monomers, oligomers, prepolymers or combinations thereof.

2. The encapsulated cure system of claim 1 wherein the carrier material is (a) of a soft, putty-like or gel-like character or (b) a solid or semi-solid that is (i) soluble in a liquid curable matrix component of the curable composition with which they are to be used, (ii) softened by a liquid curable matrix component of the curable composition with which they are to be used, (iii) softened by the reaction conditions under which the curable composition with which they are to be used is cured or polymerized, (iv) softened by the environmental conditions under which the curable composition with which they are to be used is cured or polymerized, (v) is softened by the method or process by which the curative is to be made available to other components of the curable composition with which they are to be used, (vi) rendered flowable by a liquid curable matrix component of the curable composition with which they are to be used, (vii) rendered flowable by the reaction conditions under which the curable composition with which they are to be used is cured or polymerized, (viii) rendered flowable by the environmental conditions under which the curable composition is cured or polymerized, (ix) is rendered flowable by the method or process by which the curative is to be made available to other components of the curable composition with which they are to be used.

3. The encapsulated cure system of claim 2 wherein the carrier material is of a soft putty-like or gel-like character and comprises a thixotropic or thickened composition of monomers, oligomers or pre-polymers, or a combination thereof.

4. The encapsulated cure system of claim 3 wherein the carrier material includes or comprises one or more thixotropic agents or one or more thixotropic or non-thixotropic gelling or thickening agents that are generated in-situ or act latently concurrent with or following encapsulation of the carrier material.

5. The encapsulated cure system of claim 2 wherein the carrier material is an adhesive or has latent adhesive properties.

6. The encapsulated cure system of claim 1 wherein the carrier material does not flow or deform except when subjected to forces of at least 1 psi.

7. The encapsulated cure system of claim 1 wherein the curative is dispersed in the carrier.

8. The encapsulated cure system of claim 1 wherein the curative is dissolved in the carrier.

9. The encapsulated cure system of claim 8 wherein the curative and the carrier are miscible with one another.

10. The encapsulated cure system of claim 1 wherein the curative amounts to from about 0.1 wt. percent to about 25 wt. percent of the carrier material.

11. The encapsulated cure system of claim 1 wherein the curative is a cross-linking agent or hardener and the amount of the curative is from about 2 wt. percent to about 50 wt. percent of the carrier material.

12. The encapsulated cure system of claim 1 wherein the shell comprises from about 0.8 wt. percent to about 25 wt. percent of the encapsulated cure system.

13. A curable composition comprising one or more liquid polymerizable monomers, oligomers, prepolymers or a combination thereof and an encapsulated cure system said encapsulated cure system comprising:
   a) a carrier material,
   b) an effective amount of a curative contained in said carrier material suitable for effecting cure of the aforementioned liquid polymerizable material, and
   c) a polymer capsule encasing said carrier material wherein the curative is (i) non-reactive with the carrier material in the encapsulate state, (ii) entrapped or substantially non-migratory in the carrier material and (iii) present at a concentration of at least 0.1 weight percent based on the weight of the carrier material and wherein the carrier is a natural or synthetic material or composition that is non-flowing to the extent that sufficient curative necessary to effect polymerization of a curable composition is not made available without altering the carrier to a flowable state and/or applying mechanical forces to the carrier to work the carrier and thereby expose or make available more of the entrapped curative, wherein the carrier material is selected from the group consisting of hot melts, pressure sensitive adhesives, rubber materials, elastomer/tackifier compositions, a polymer whose Tg is less than 35° C., semi-solid and solid resins, starches and starch-based polymers, hydrogels, low temperature waxes and a thickened or gel-like mass of one or more monomers, oligomers, prepolymers or combinations thereof.

14. The encapsulated cure system of claim 13 wherein the carrier material is (a) of a soft, putty-like or gel-like character or (b) a solid or semi-solid that is (i) soluble in a liquid curable matrix component of the curable composition with which they are to be used, (ii) softened by a liquid curable matrix component of the curable composition with which they are to be used, (iii) softened by the reaction conditions under which the curable composition with which they are to be used is cured or polymerized, (iv) softened by the environmental conditions under which the curable composition with which they are to be used is cured or polymerized, (v) is softened by the method or process by which the curative is to be made available to other components of the curable composition with which they are to be used, (vi) rendered flowable by a liquid curable matrix component of the curable composition with which they are to be used, (vii) rendered flowable by the reaction conditions under which the curable composition with which they are to be used is cured or polymerized, (viii) rendered flowable by the environmental conditions under which the curable composition with which they are to be used is cured or polymerized, (ix) is rendered flowable by the method or process by which the curative is to be made available to other components of the curable composition with which they are to be used.

15. The curable composition of claim 13 wherein the encapsulated curative is dispersed in the liquid polymerizable component which further comprises a thickening agent or a thixotrope so that the encapsulated curative will remain suspended therein.

16. The curable composition of claim 13 wherein the liquid polymerizable material is selected from the group consisting of monomers, oligomers and/or prepolymers that undergo vinyl polymerization; unsaturated polyesters; urethanes; epoxy resins; polysulfides; isocyanates; silicones; polyethers, polyurethanes and polyolefins having silanol moieties capable of undergoing silanol condensation or hydrosilation reactions; and phenoxy resins.

17. An adhesive or sealant composition that is capable of being preapplied to a substrate comprising:
  a) an encapsulated cure system containing a curative and
  b) a separately encapsulated liquid curable composition, both encapsulated components (a) and (b) being dispersed in
  c) a binder for adhering the encapsulated components to the substrate to which they are to be applied; wherein the curative is present in an effective amount for effecting cure of the encapsulated liquid curable composition and wherein the encapsulated cure system comprises the aforementioned curative, a carrier material in which the curative is incorporated and a polymer capsule encasing said carrier material wherein the curative is (i) non-reactive with the carrier material in the encapsulate state, (ii) entrapped or substantially non-migratory in the carrier material and (iii) present at a concentration of at least 0.1 weight percent based on the weight of the carrier material and wherein the carrier is a natural or synthetic material or composition that is non-flowing to the extent that sufficient curative necessary to effect polymerization of a curable composition is not made available without altering the carrier to a flowable state and/or applying mechanical forces to the carrier to work the carrier and thereby expose or make available more of the entrapped curative, wherein the carrier material is selected from the group consisting of hot melts, pressure sensitive adhesives, rubber materials, elastomer/tackifier compositions, a polymer whose Tg is less than 35° C., semi-solid and solid resins, starches and starch-based polymers, hydrogels, low temperature waxes and a thickened or gel-like mass of one or more monomers, oligomers, prepolymers or combinations thereof.

18. The composition of claim 17 wherein the carrier material is (a) of a soft, putty-like or gel-like character or (b) a solid or semi-solid that is (i) soluble in a liquid curable matrix component of the curable composition with which they are to be used, (ii) softened by a liquid curable matrix component of the curable composition with which they are to be used, (iii) softened by the reaction conditions under which the curable composition with which they are to be used is cured or polymerized, (iv) softened by the environmental conditions under which the curable composition with which they are to be used is cured or polymerized, (v) is softened by the method or process by which the curative is to be made available to other components of the curable composition with which they are to be used, (vi) rendered flowable by a liquid curable matrix component of the curable composition with which they are to be used, (vii) rendered flowable by the reaction conditions under which the curable composition with which they are to be used is cured or polymerized, (viii) rendered flowable by the environmental conditions under which the curable composition with which they are to be used is cured or polymerized, (ix) is rendered flowable by the method or process by which the curative is to be made available to other components of the curable composition with which they are to be used.

19. The composition of claim 17 wherein the binder material is selected from the group consisting of (a) an adhesive or coating material in solution, (b) an aqueous based binder system, and (c) an actinic radiation curable composition.

20. The composition of claim 17 wherein the carrier material is of a soft putty-like or gel-like character and comprises a thixotropic or thickened composition of monomers, oligomers or pre-polymers, or a combination thereof, which composition is substantially non-reactive with the curative in the encapsulated state.

21. The composition of claim 17 wherein the liquid curable composition is selected from the group consisting of monomers, oligomers and/or prepolymers that undergo vinyl polymerization; unsaturated polyesters; urethanes; epoxy resins; polysulfides; isocyanates; silicones; polyethers, polyurethanes and polyolefins having silanol moieties capable of undergoing silanol condensation or hydrosilation reactions; and phenoxy resins.

* * * * *